US012608197B2

(12) United States Patent
Verma

(10) Patent No.: US 12,608,197 B2
(45) Date of Patent: Apr. 21, 2026

(54) VERSION CONTROL INTEGRATION IN CROSS-DOMAIN-BASED AUTHENTICATION SYSTEMS

(71) Applicant: SAS Institute Inc., Cary, NC (US)

(72) Inventor: Rahul Verma, Ichhawar (IN)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/097,634

(22) Filed: Apr. 1, 2025

(65) Prior Publication Data

US 2026/0044337 A1    Feb. 12, 2026

(30) Foreign Application Priority Data

Aug. 8, 2024    (IN) .............................. 202411060000

(51) Int. Cl.
G06F 8/71        (2018.01)
H04L 9/40        (2022.01)

(52) U.S. Cl.
CPC .............. G06F 8/71 (2013.01); H04L 63/102 (2013.01); H04L 63/20 (2013.01)

(58) Field of Classification Search
CPC .......... G06F 8/71; H04L 63/102; H04L 63/20
See application file for complete search history.

(56) References Cited

U.S. PATENT DOCUMENTS

| | | | | |
|---|---|---|---|---|
| 7,822,706 B1 * | 10/2010 | Baltazar | ................. | G06Q 10/10 |
| | | | | 707/802 |
| 9,565,190 B1 * | 2/2017 | Telvik | ................. | H04L 63/0807 |
| 11,063,762 B1 * | 7/2021 | Makarskyy | ............. | G06F 9/547 |
| 11,386,887 B1 * | 7/2022 | Teng | ..................... | G10L 15/183 |
| 12,120,124 B1 * | 10/2024 | Davis | ..................... | H04L 63/105 |
| 2002/0138728 A1 * | 9/2002 | Parfenov | ............. | H04L 63/0823 |
| | | | | 713/153 |
| 2006/0129627 A1 * | 6/2006 | Phillips | ................... | H04L 63/10 |
| | | | | 709/200 |
| 2008/0133533 A1 * | 6/2008 | Ganugapati | ............. | G06F 21/45 |
| | | | | 707/999.009 |
| 2011/0154130 A1 * | 6/2011 | Helander | .............. | H04L 63/168 |
| | | | | 714/48 |

(Continued)

*Primary Examiner* — Jason Chiang

(74) *Attorney, Agent, or Firm* — Padowithz Alce; Quintin Scheitlin; Alce PLLC

(57) ABSTRACT

A system, method, and computer-program product includes receiving, from a third-party identity management system, an authentication response indicating a set of login attributes; obtaining, from an identity resolution service, a set of identity and authorization attributes using the set of login attributes, the set of identity and authorization attributes including a unique user identifier (UID); granting, by the identity resolution service, a session initiation token when the set of identity and authorization attributes satisfy predefined authorization criteria; in response to the identity resolution service granting the session initiation token: allocating a compute session and a persistent storage resource to the unique UID; executing, via the compute session, an operation that modifies files stored in the persistent storage resource; and transmitting, to a version control system, a version control operation that records the files modified in the persistent storage resource to a code repository using the unique UID or group identifiers.

30 Claims, 22 Drawing Sheets

(56)                References Cited

U.S. PATENT DOCUMENTS

| | | | | |
|---|---|---|---|---|
| 2011/0154465 | A1* | 6/2011 | Kuzin | H04L 67/08 |
| | | | | 726/9 |
| 2020/0322376 | A1* | 10/2020 | Edmonds | H04L 63/0807 |
| 2021/0390170 | A1* | 12/2021 | Olden | H04L 63/08 |
| 2022/0060523 | A1* | 2/2022 | Brevoort | G06Q 50/40 |
| 2022/0413659 | A1* | 12/2022 | Demmer | H04L 51/04 |
| 2023/0171253 | A1* | 6/2023 | Liu | G06F 9/541 |
| | | | | 726/7 |
| 2023/0198991 | A1* | 6/2023 | Boehme | H04L 63/105 |
| | | | | 726/1 |
| 2023/0362643 | A1* | 11/2023 | Jindal | H04W 12/086 |
| 2024/0195847 | A1* | 6/2024 | Mourachov | H04L 65/1089 |
| 2024/0372728 | A1* | 11/2024 | Achhra | G06Q 20/29 |
| 2024/0394147 | A1* | 11/2024 | Tsuchiya | G06F 3/065 |
| 2024/0411528 | A1* | 12/2024 | Ziolkowski | G06F 8/72 |
| 2025/0077191 | A1* | 3/2025 | Ballantyne | G06F 8/71 |
| 2025/0159001 | A1* | 5/2025 | Edwards | H04L 63/0807 |

* cited by examiner

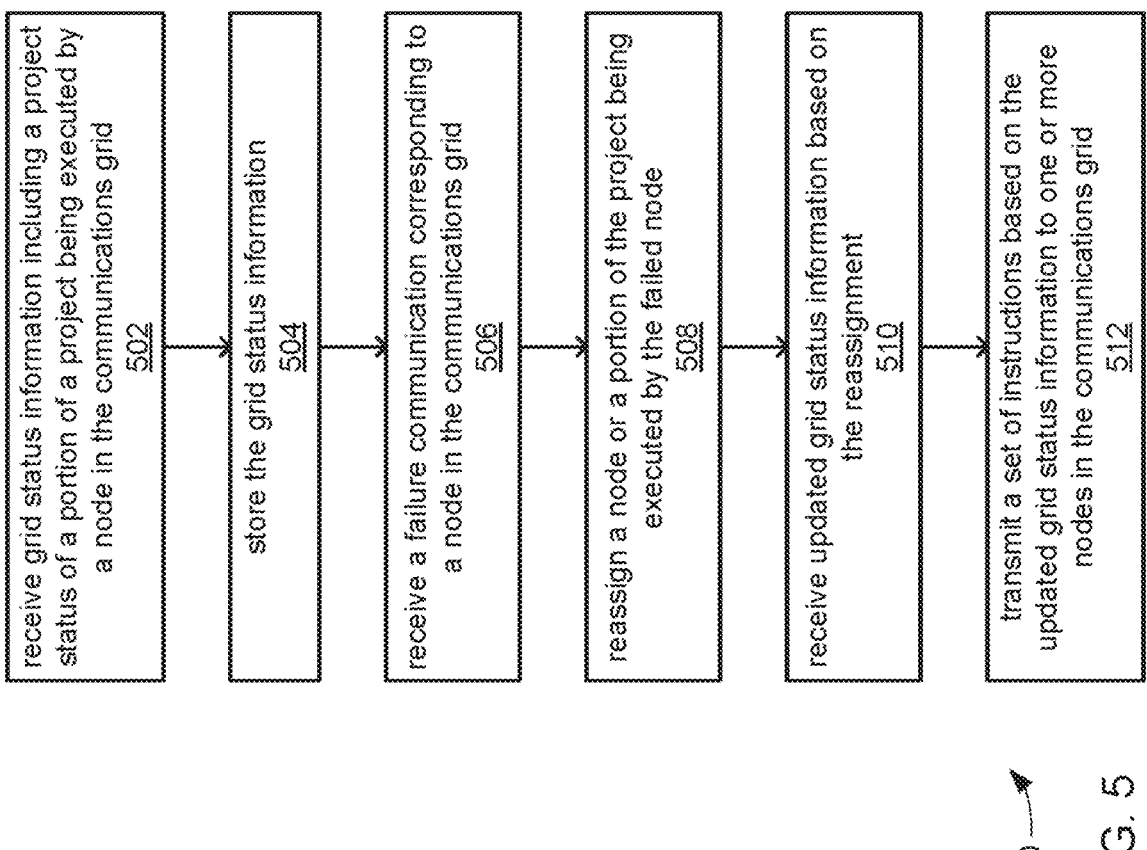

receive grid status information including a project status of a portion of a project being executed by a node in the communications grid
502 store the grid status information
504 receive a failure communication corresponding to a node in the communications grid
506 reassign a node or a portion of the project being executed by the failed node
508 receive updated grid status information based on the reassignment
510 transmit a set of instructions based on the updated grid status information to one or more nodes in the communications grid
512

700 receive request for executing a project
702 receive request for grid computing environment to execute project?
704 initiate and execute project in gridded environment & perform data analysis
706 transmit results of analysis
708 initiate and execute project in solo environment
710 provide results of project
712

900 instantive event stream processing engine
900 create engine container
902 instantiate continuous queries
904 initialize publish/subscribe capability
906 start projects
908 receive event block
910 process event block
912 output processed event block
914 stop processing?
916 no yes stop projects
918 shutdown
920 receive training data
1102 train machine-learning model using training data
1104 evaluate machine-learning model
1106 adequate accuracy?
1108 no yes receive new data
1110 analyze new data using trained machine-learning model
1112 post-processing on result
1114

1100

1300

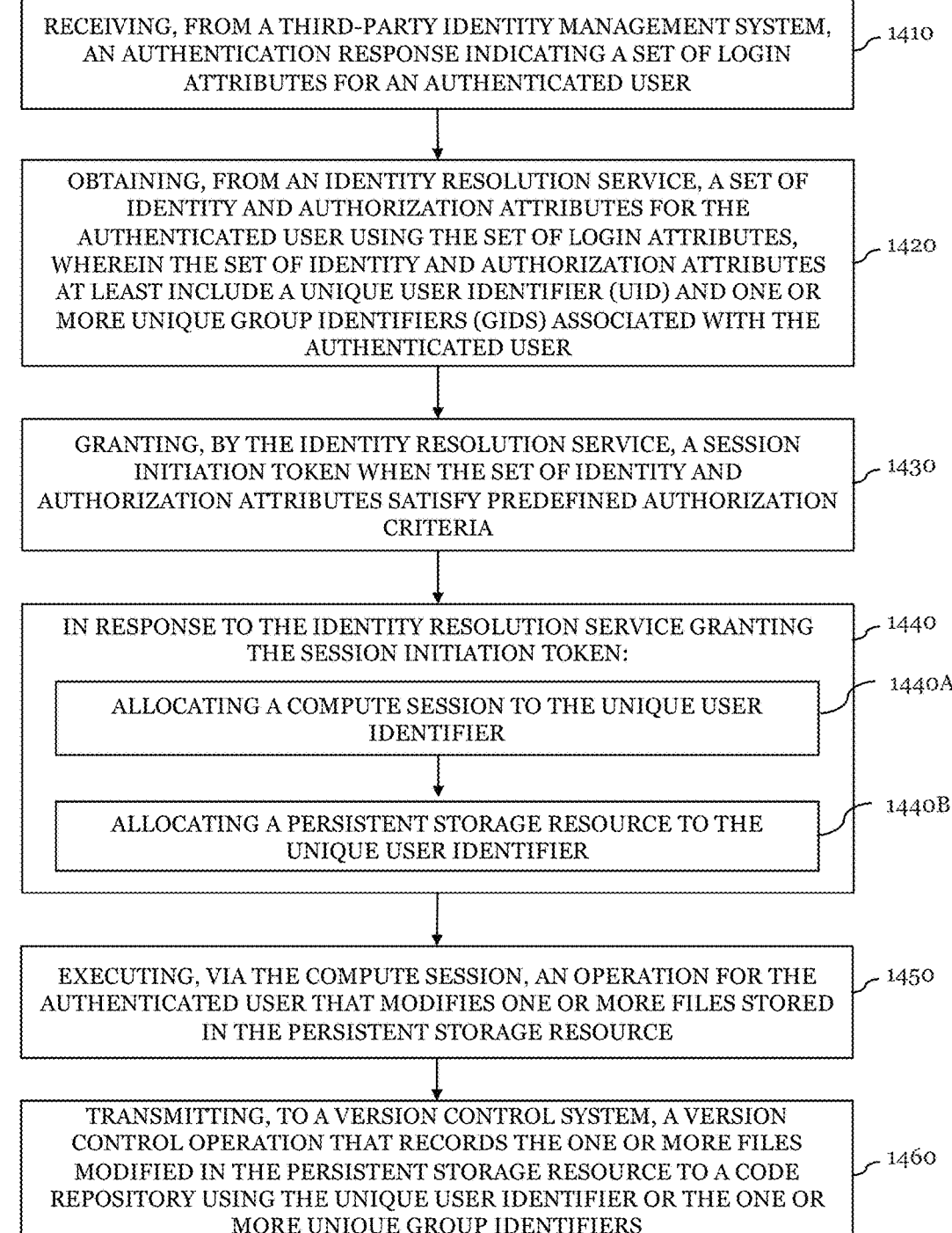

1400

RECEIVING, FROM A THIRD-PARTY IDENTITY MANAGEMENT SYSTEM, AN AUTHENTICATION RESPONSE INDICATING A SET OF LOGIN ATTRIBUTES FOR AN AUTHENTICATED USER ⟋ 1410

OBTAINING, FROM AN IDENTITY RESOLUTION SERVICE, A SET OF IDENTITY AND AUTHORIZATION ATTRIBUTES FOR THE AUTHENTICATED USER USING THE SET OF LOGIN ATTRIBUTES, WHEREIN THE SET OF IDENTITY AND AUTHORIZATION ATTRIBUTES AT LEAST INCLUDE A UNIQUE USER IDENTIFIER (UID) AND ONE OR MORE UNIQUE GROUP IDENTIFIERS (GIDS) ASSOCIATED WITH THE AUTHENTICATED USER ⟋ 1420

GRANTING, BY THE IDENTITY RESOLUTION SERVICE, A SESSION INITIATION TOKEN WHEN THE SET OF IDENTITY AND AUTHORIZATION ATTRIBUTES SATISFY PREDEFINED AUTHORIZATION CRITERIA ⟋ 1430

IN RESPONSE TO THE IDENTITY RESOLUTION SERVICE GRANTING THE SESSION INITIATION TOKEN: ⟋ 1440

ALLOCATING A COMPUTE SESSION TO THE UNIQUE USER IDENTIFIER ⟋ 1440A

ALLOCATING A PERSISTENT STORAGE RESOURCE TO THE UNIQUE USER IDENTIFIER ⟋ 1440B

EXECUTING, VIA THE COMPUTE SESSION, AN OPERATION FOR THE AUTHENTICATED USER THAT MODIFIES ONE OR MORE FILES STORED IN THE PERSISTENT STORAGE RESOURCE ⟋ 1450

TRANSMITTING, TO A VERSION CONTROL SYSTEM, A VERSION CONTROL OPERATION THAT RECORDS THE ONE OR MORE FILES MODIFIED IN THE PERSISTENT STORAGE RESOURCE TO A CODE REPOSITORY USING THE UNIQUE USER IDENTIFIER OR THE ONE OR MORE UNIQUE GROUP IDENTIFIERS ⟋ 1460

FIGURE 14

1544 identifier.generateGids     1546   1547A
Generate GIDs for users and groups.

identifier.generateUids     1548   1547B
Generate UIDs for users.

1510

Identity Resolution Service

UID 1534A ⟶

GIDs 1534B ⟶

Pre-Defined Authorization Criteria

1551

1550

Session Initiation Token

1504

Network File System

UID 1534A ⟶
GIDs 1534B

Access Control Policy 1504A ⟶ Files 1504B

1552

VERSION CONTROL INTEGRATION IN CROSS-DOMAIN-BASED AUTHENTICATION SYSTEMS

CROSS-REFERENCE TO RELATED APPLICATIONS

This application claims the benefit of priority to Indian Patent Application No.: 202411060000, filed on 8 Aug. 2024, incorporated herein by reference in its entirety for all purposes.

TECHNICAL FIELD

This invention relates generally to the cross-domain-based authentication field and, more specifically, to new and useful systems and methods for enabling version control in cross-domain-based authentication systems.

BACKGROUND

In some instances, a user interacting with a first device may request to access files stored on a second device. A server implementing a network file system (NFS) may enable the first device to access the files stored on the second device as though the files were stored locally on the first device (e.g., the first device may modify the files and their corresponding repository as though they are local to the first device). At least some of the files accessed using the NFS may be private to the user (e.g., intended just for the user to access). To enable these files to be private, the server implementing the NFS may determine whether the user is authorized to access particular files before granting access to the files. For instance, the server may retrieve credentials associated with a particular user (e.g., from an identity management system) and may determine which files, if any, the user can access.

In certain systems that utilize an NFS, multiple identity providers may be employed. Some of the identity providers may provide different identity parameters from those of other identity providers. Accordingly, scenarios may occur in which the server implementing the NFS receives identity parameters from a particular identity provider but fails to authenticate the associated user because one or more of the identity parameters that the server implementing the NFS is configured to receive may be missing or may have a format different from that which the NFS is configured to process. In such examples, the NFS may fail to authenticate the associated user and the user may be unable to access the files. Techniques that enable NFS to be securely used with multiple identity providers may be desired.

BRIEF SUMMARY OF THE EMBODIMENTS

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one embodiment, a computer-program product comprising a non-transitory machine-readable storage medium stores computer instructions that, when executed by one or more processors, perform operations comprising: receiving, from a third-party identity management system, an authentication response indicating a set of login attributes for an authenticated user; obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user; granting, by the identity resolution service, a session initiation token when the set of identity and authorization attributes satisfy predefined authorization criteria; in response to the identity resolution service granting the session initiation token: allocating a compute session to the unique user identifier, and allocating a persistent storage resource to the unique user identifier; executing, via the compute session, an operation for the authenticated user that modifies one or more files stored in the persistent storage resource; and transmitting, to a version control system, a version control operation that records the one or more files modified in the persistent storage resource to a code repository using the unique user identifier or the one or more unique group identifiers.

In some embodiments of the computer-program product, obtaining the set of identity and authorization attributes for the authenticated user using the set of login attributes includes: searching the identity resolution service for a user profile corresponding to the set of login attributes, and after searching the identity resolution service for the user profile, retrieving the unique user identifier and the one or more unique group identifiers from the user profile.

In some embodiments of the computer-program product, obtaining the set of identity and authorization attributes for the authenticated user using the set of login attributes includes: detecting that the identity resolution service does not include a user profile corresponding to the set of login attributes, and in response to detecting that the identity resolution service does not include the user profile: automatically generating the unique user identifier and the one or more unique group identifiers, creating the user profile that associates the set of login attributes with the unique user identifier and the one or more unique group identifiers, and returning, in a response from the identity resolution service, the unique user identifier and the one or more unique group identifiers.

In some embodiments of the computer-program product, the computer instructions, when executed by the one or more processors, perform operations further comprising: before receiving the authentication response from the third-party identity management system: receiving, via a user interface, user input activating an automatic unique user identifier generator control element and an automatic unique group identifier generator control element, and in response to receiving the user input, configuring the identity resolution service to generate the unique user identifier and the one or more unique group identifiers for the authenticated user when the set of login attributes are new to the identity resolution service.

In some embodiments of the computer-program product, the one or more files stored in the persistent storage resource are copied from a network file system, and the computer instructions, when executed by the one or more processors, perform operations further comprising: after receiving the user input: configuring the network file system to include a security policy that authorizes the unique user identifier to copy the one or more files from the network file system, and configuring the version control system to authorize the unique user identifier to accept the version control operation from the unique user identifier.

In some embodiments of the computer-program product, the session initiation token encrypts the unique user identifier and the one or more unique group identifiers associated with the authenticated user.

In some embodiments of the computer-program product, allocating the persistent storage resource to the unique user identifier includes: transmitting the session initiation token from the compute session to a network file system, decrypting the session initiation token to extract the unique user identifier and the one or more unique group identifiers, determining that the network file system includes a security policy authorizing the unique user identifier and the one or more unique group identifiers to copy the one or more files in the network file system, and allocating the persistent storage resource to the unique user identifier in response to determining that the network file system includes the security policy.

In some embodiments of the computer-program product, the computer instructions, when executed by one or more processors, perform operations comprising: in response to the identity resolution service granting the session initiation token: providing the session initiation token to a logon manager application, authorizing, by the logon manager application, allocation of the compute session to the unique user identifier based on the session initiation token, and allocating, by the logon manager application, the compute session to the unique user identifier in response to the authorizing by the logon manager application.

In some embodiments of the computer-program product, the set of identity and authorization attributes satisfy the predefined authorization criteria when the one or more unique group identifiers correspond to: a group that authorizes access to the compute session, and a group that authorizes access to a network file system linked to the persistent storage resource.

In some embodiments of the computer-program product, the authentication response does not include the unique user identifier and the one or more unique group identifiers, and the compute session, the persistent storage resource, and the version control system depend on the unique user identifier and the one or more unique group identifiers for operation.

In some embodiments of the computer-program product, allocating the persistent storage resource to the unique user identifier includes: creating a persistent volume of a network file system, creating a persistent volume claim from the persistent volume, mounting the persistent volume claim on a virtual machine, and allocating the persistent volume claim to the unique user identifier.

In some embodiments of the computer-program product, the operation that modifies the one or more files in the persistent storage resource is received from a code development application connected to the compute session.

In some embodiments of the computer-program product, the unique user identifier associated with the authenticated user corresponds to a system-generated identifier that uniquely represents an identity of the authenticated user in a target system, and the one or more unique group identifiers associated with the authenticated user correspond to system-generated identifiers that uniquely represent permissions of the authenticated user in the target system.

In some embodiments of the computer-program product, the set of login attributes for the authenticated user includes one or more of: a username associated with the authenticated user, an email address associated with the authenticated user, a first name associated with the authenticated user, and a last name associated with the authenticated user.

In some embodiments of the computer-program product, the operation that modifies the one or more files stored in the persistent storage resource includes one or more of: deleting a first file of the one or more files stored in the persistent storage resource, renaming a second file of the one or more files stored in the persistent storage resource, updating contents of a third file of the one or more files stored in the persistent storage resource, adding a new file to the one or more files stored in the persistent storage resource, and moving a fourth file of the one or more files stored in the persistent storage resource to a new location within the persistent storage resource.

In some embodiments of the computer-program product, the version control operation corresponds to one or more of: cloning the code repository from the version control system, pulling a set of code updates from the code repository, and pushing the one or more files modified in the persistent storage resource to the code repository.

In other embodiments, a computer-implemented method may comprise: receiving, from a third-party identity management system, an authentication response indicating a set of login attributes for an authenticated user; obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user; granting, by the identity resolution service, a session initiation token when the set of identity and authorization attributes satisfy predefined authorization criteria; in response to the identity resolution service granting the session initiation token: allocating a compute session to the unique user identifier, and allocating a persistent storage resource to the unique user identifier; executing, via the compute session, an operation for the authenticated user that modifies one or more files stored in the persistent storage resource; and transmitting, to a version control system, a version control operation that records the one or more files modified in the persistent storage resource to a code repository using the unique user identifier or the one or more unique group identifiers.

In some embodiments of the computer-implemented method, obtaining the set of identity and authorization attributes for the authenticated user using the set of login attributes includes: searching the identity resolution service for a user profile corresponding to the set of login attributes, and after searching the identity resolution service for the user profile, retrieving the unique user identifier and the one or more unique group identifiers from the user profile.

In some embodiments of the computer-implemented method, obtaining the set of identity and authorization attributes for the authenticated user using the set of login attributes includes: detecting that the identity resolution service does not include a user profile corresponding to the set of login attributes, and in response to detecting that the identity resolution service does not include the user profile: automatically generating the unique user identifier and the one or more unique group identifiers, creating the user profile that associates the set of login attributes with the unique user identifier and the one or more unique group identifiers, and returning, in a response from the identity resolution service, the unique user identifier and the one or more unique group identifiers.

In some embodiments, the computer-implemented method may further comprise: before receiving the authentication response from the third-party identity management system: receiving, via a user interface, user input activating an automatic unique user identifier generator control element and an automatic unique group identifier generator control element, and in response to receiving the user input, configuring the identity resolution service to generate the unique user identifier and the one or more unique group identifiers for the authenticated user when the set of login attributes are new to the identity resolution service.

In some embodiments of the computer-implemented method, the one or more files stored in the persistent storage resource are copied from a network file system, and the method further comprises: after receiving the user input: configuring the network file system to include a security policy that authorizes the unique user identifier to copy the one or more files from the network file system, and configuring the version control system to authorize the unique user identifier to accept the version control operation from the unique user identifier.

In some embodiments of the computer-implemented method, the session initiation token encrypts the unique user identifier and the one or more unique group identifiers associated with the authenticated user.

In some embodiments of the computer-implemented method, allocating the persistent storage resource to the unique user identifier includes: transmitting the session initiation token from the compute session to a network file system, decrypting the session initiation token to extract the unique user identifier and the one or more unique group identifiers, determining that the network file system includes a security policy authorizing the unique user identifier and the one or more unique group identifiers to copy the one or more files in the network file system, and allocating the persistent storage resource to the unique user identifier in response to determining that the network file system includes the security policy.

In some embodiments, the computer-implemented method further comprises: in response to the identity resolution service granting the session initiation token: providing the session initiation token to a logon manager application, authorizing, by the logon manager application, allocation of the compute session to the unique user identifier based on the session initiation token, and allocating, by the logon manager application, the compute session to the unique user identifier in response to the authorizing by the logon manager application.

In some embodiments of the computer-implemented method, the set of identity and authorization attributes satisfy the predefined authorization criteria when the one or more unique group identifiers correspond to: a group that authorizes access to the compute session, and a group that authorizes access to a network file system linked to the persistent storage resource.

In some embodiments of the computer-implemented method, the authentication response does not include the unique user identifier and the one or more unique group identifiers, and the compute session, the persistent storage resource, and the version control system depend on the unique user identifier and the one or more unique group identifiers for operation.

In some embodiments of the computer-implemented method, allocating the persistent storage resource to the unique user identifier includes: creating a persistent volume of a network file system, creating a persistent volume claim from the persistent volume, mounting the persistent volume claim on a virtual machine, and allocating the persistent volume claim to the unique user identifier.

In some embodiments of the computer-implemented method, the operation that modifies the one or more files in the persistent storage resource is received from a code development application connected to the compute session.

In some embodiments of the computer-implemented method, the unique user identifier associated with the authenticated user corresponds to a system-generated identifier that uniquely represents an identity of the authenticated user in a target system, and the one or more unique group identifiers associated with the authenticated user correspond to system-generated identifiers that uniquely represent permissions of the authenticated user in the target system.

In some embodiments, a computer-implemented system may comprise: one or more processors; a memory; and a computer-readable medium operably coupled to the one or more processors, the computer-readable medium having computer-readable instructions stored thereon that, when executed by the one or more processors, cause a computing device to perform operations comprising: receiving, from a third-party identity management system, an authentication response indicating a set of login attributes for an authenticated user; obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user; granting, by the identity resolution service, a session initiation token when the set of identity and authorization attributes satisfy predefined authorization criteria; in response to the identity resolution service granting the session initiation token: allocating a compute session to the unique user identifier, and allocating a persistent storage resource to the unique user identifier; executing, via the compute session, an operation for the authenticated user that modifies one or more files stored in the persistent storage resource; and transmitting, to a version control system, a version control operation that records the one or more files modified in the persistent storage resource to a code repository using the unique user identifier or the one or more unique group identifiers.

BRIEF DESCRIPTION OF THE FIGURES

FIG. 5 illustrates a flow chart showing an example process for adjusting a communications grid or a work project in a communications grid after a failure of a node, according to some embodiments of the present technology.

7

Figure 8:
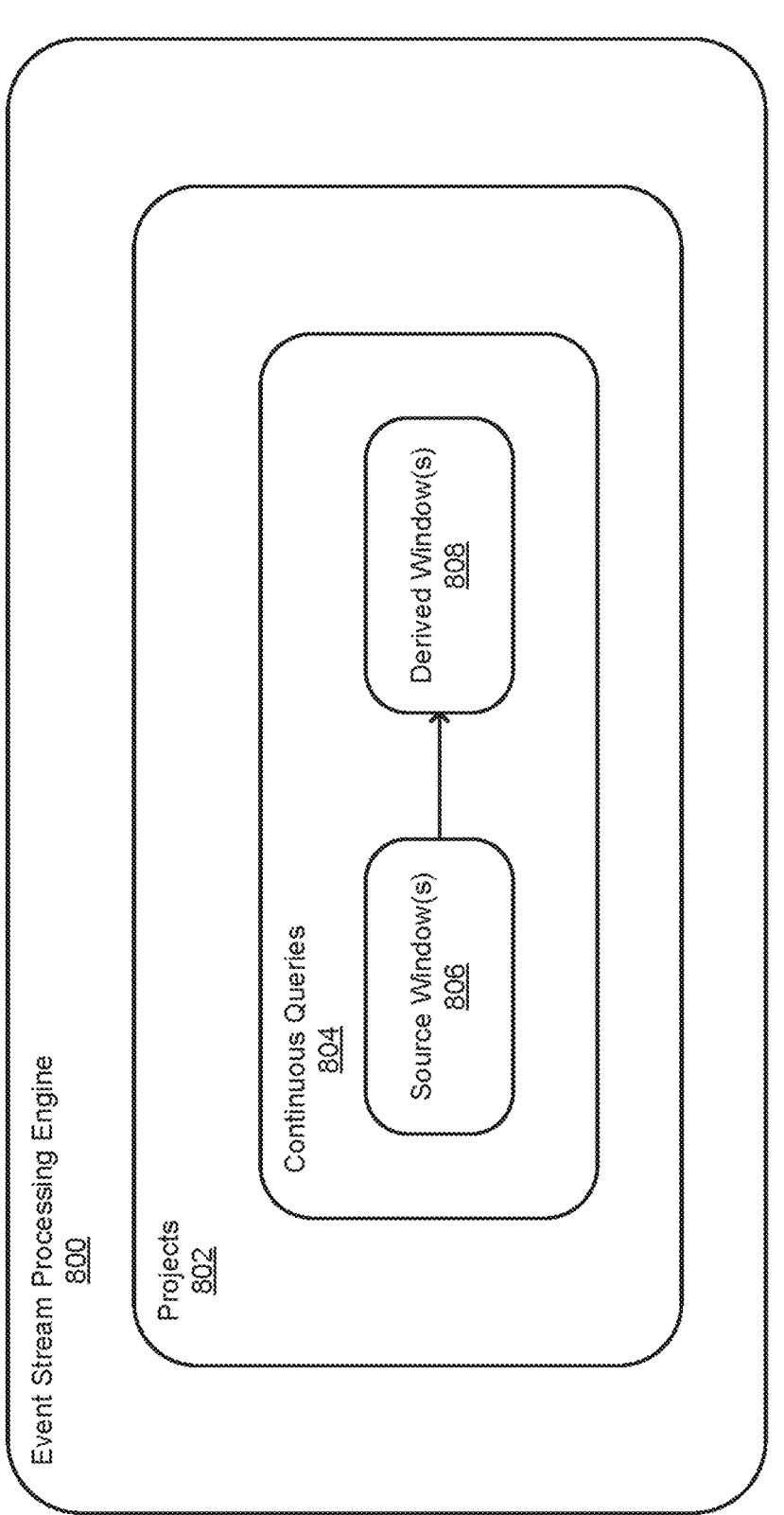

FIG. 8 illustrates a block diagram including components of an Event Stream Processing Engine (ESPE), according to some embodiments of the present technology.

Figure 9:
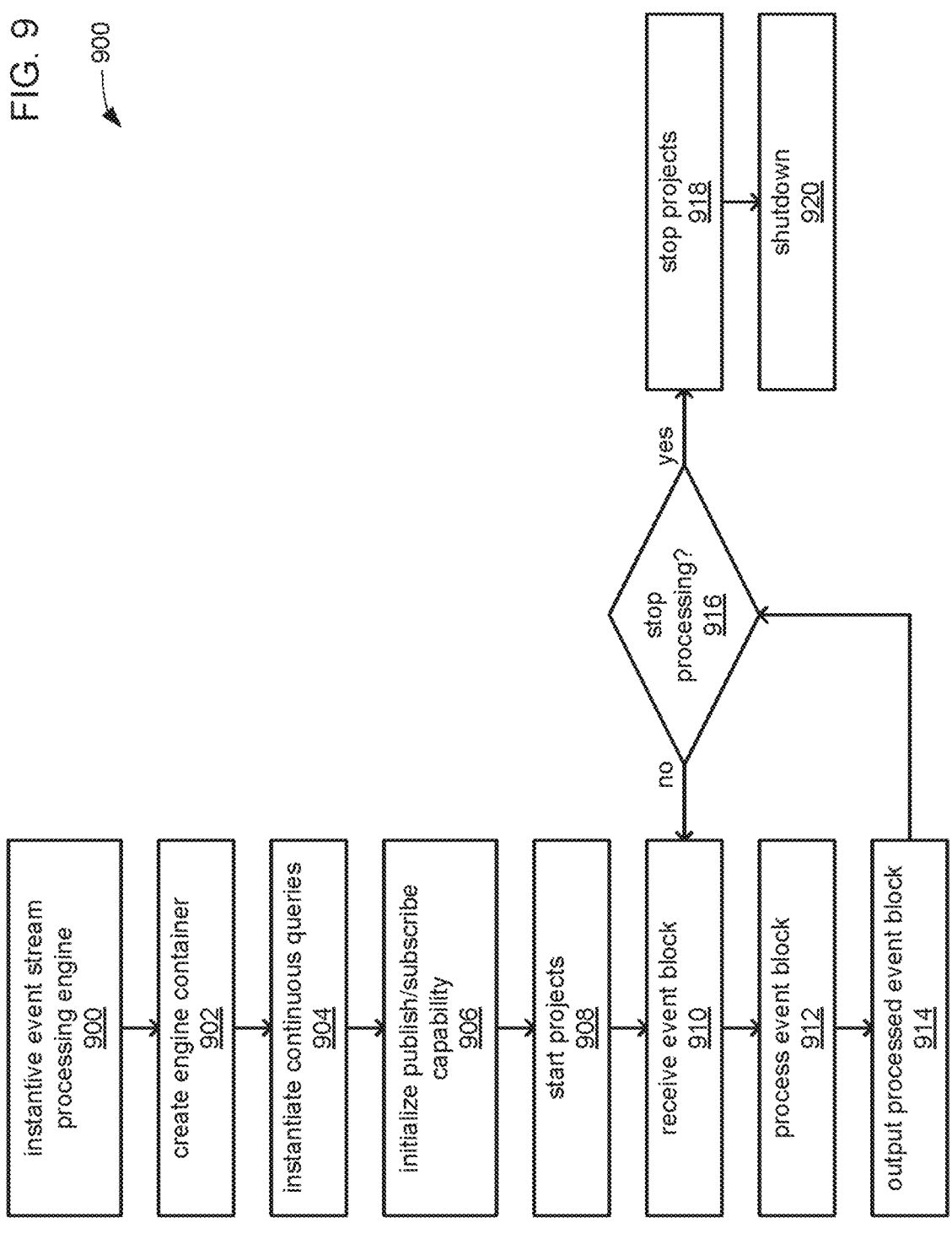

FIG. 9 illustrates a flow chart showing an example process including operations performed by an event stream processing engine, according to some embodiments of the present technology.

Figure 10:
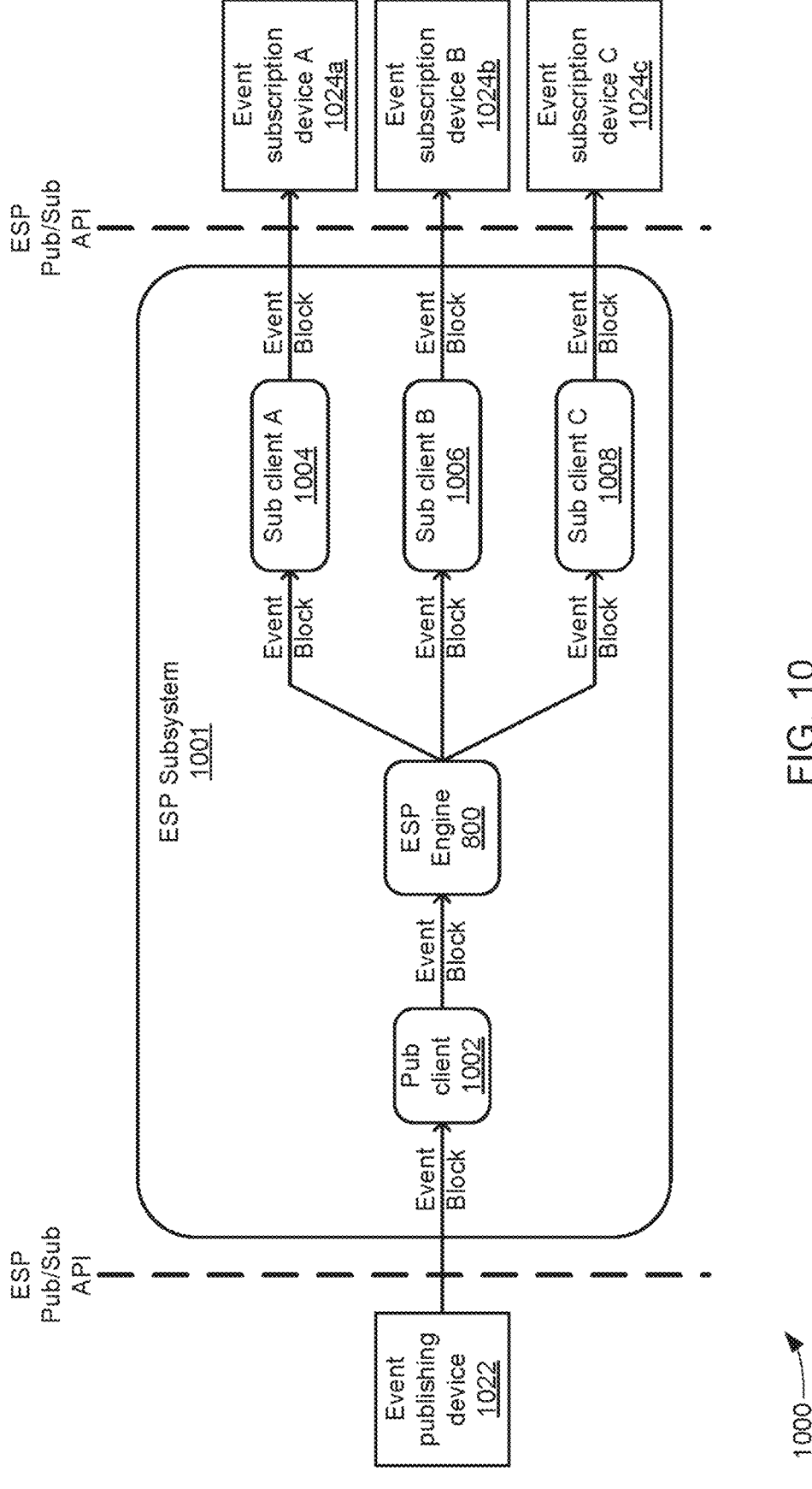

FIG. 10 illustrates an ESP system interfacing between a publishing device and multiple event subscribing devices, according to some embodiments of the present technology.

Figure 11:
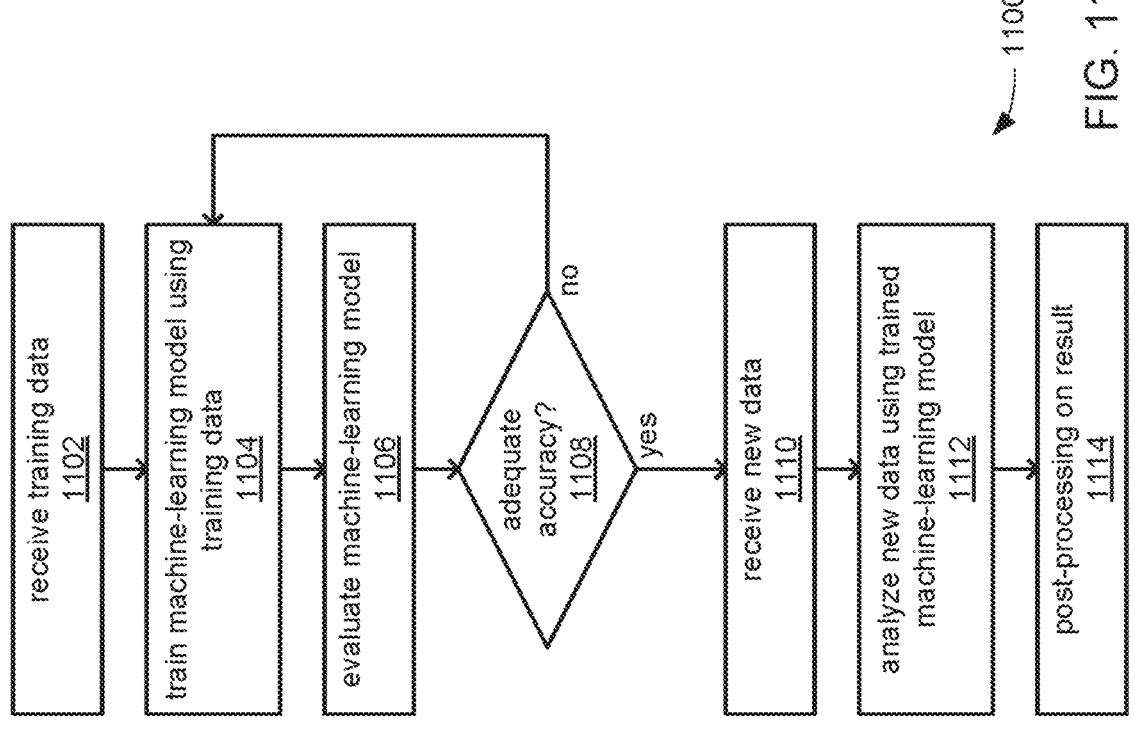

FIG. 11 illustrates a flow chart of an example of a process for generating and using a machine-learning model according to some aspects, according to some embodiments of the present technology.

Figure 12:
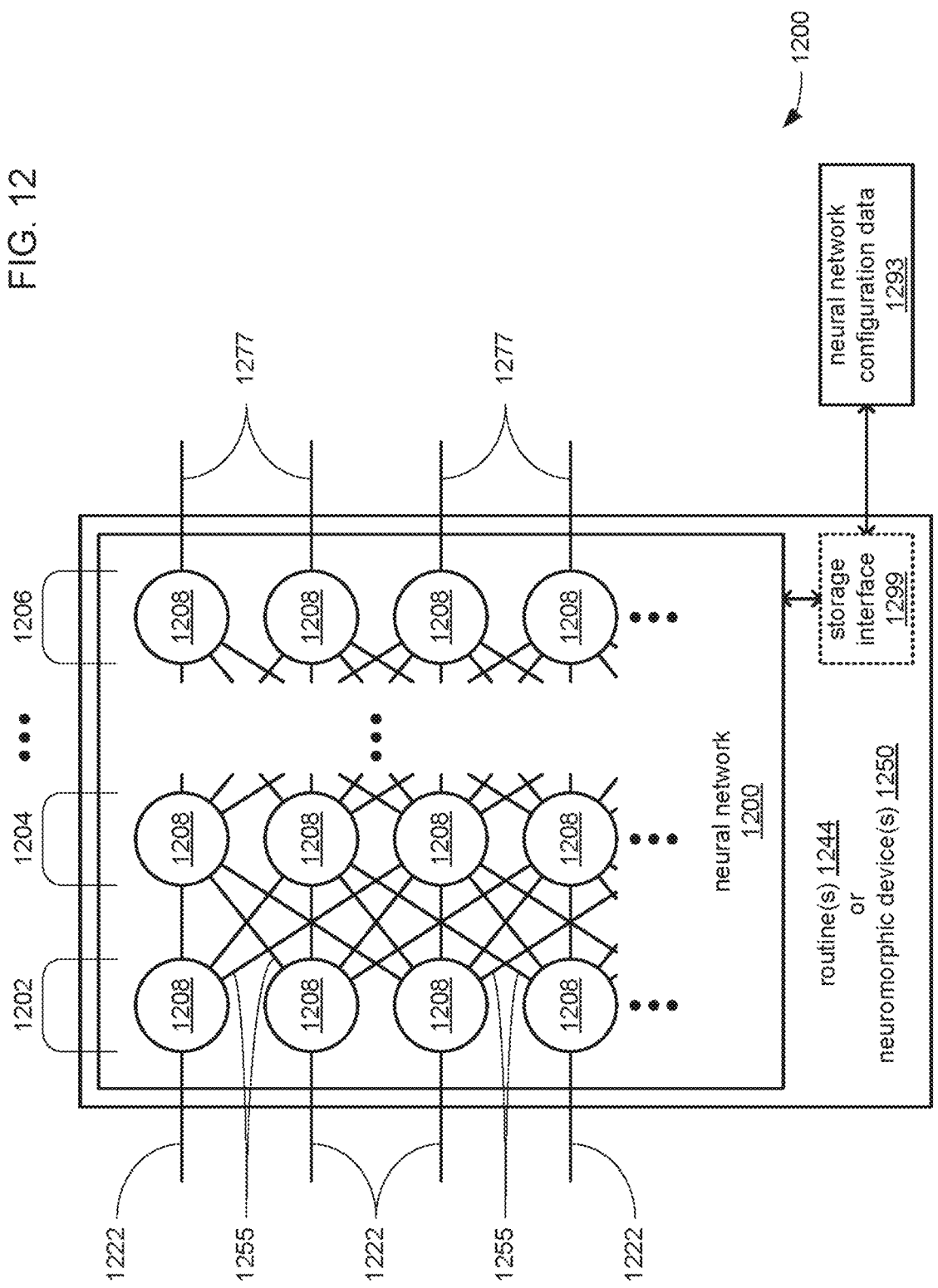

FIG. 12 illustrates an example of a machine-learning model as a neural network, according to some embodiments of the present technology.

Figure 13:
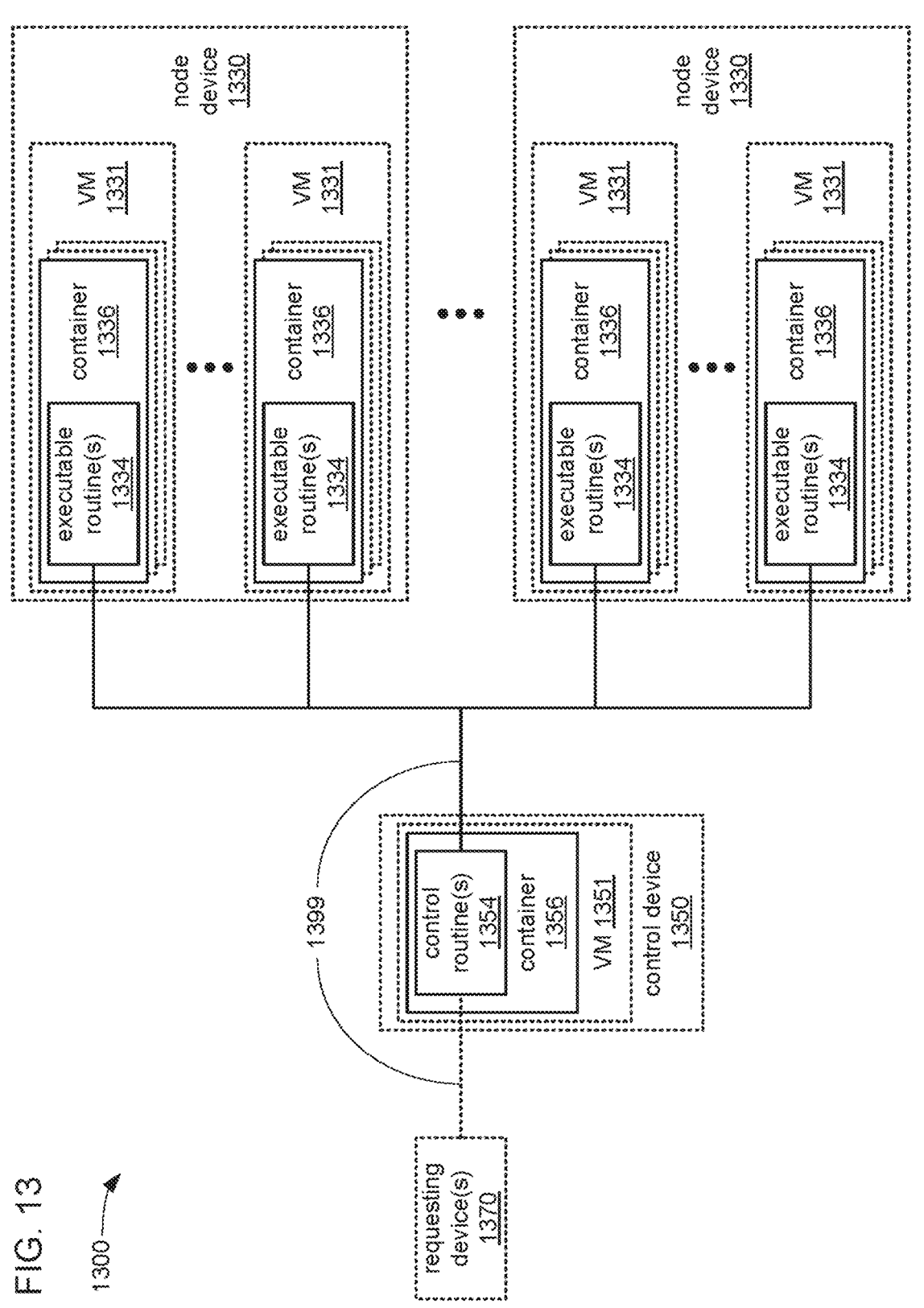

FIG. 13 illustrates various aspects of the use of containers as a mechanism to allocate processing, storage and/or other resources of a processing system to the performance of various analyses, according to some embodiments of the present technology.

FIG. 14 illustrates a flow chart showing an example process that enables version control integration in cross-domain-based authentication systems, according to some embodiments of the present technology.

Figure 15A:
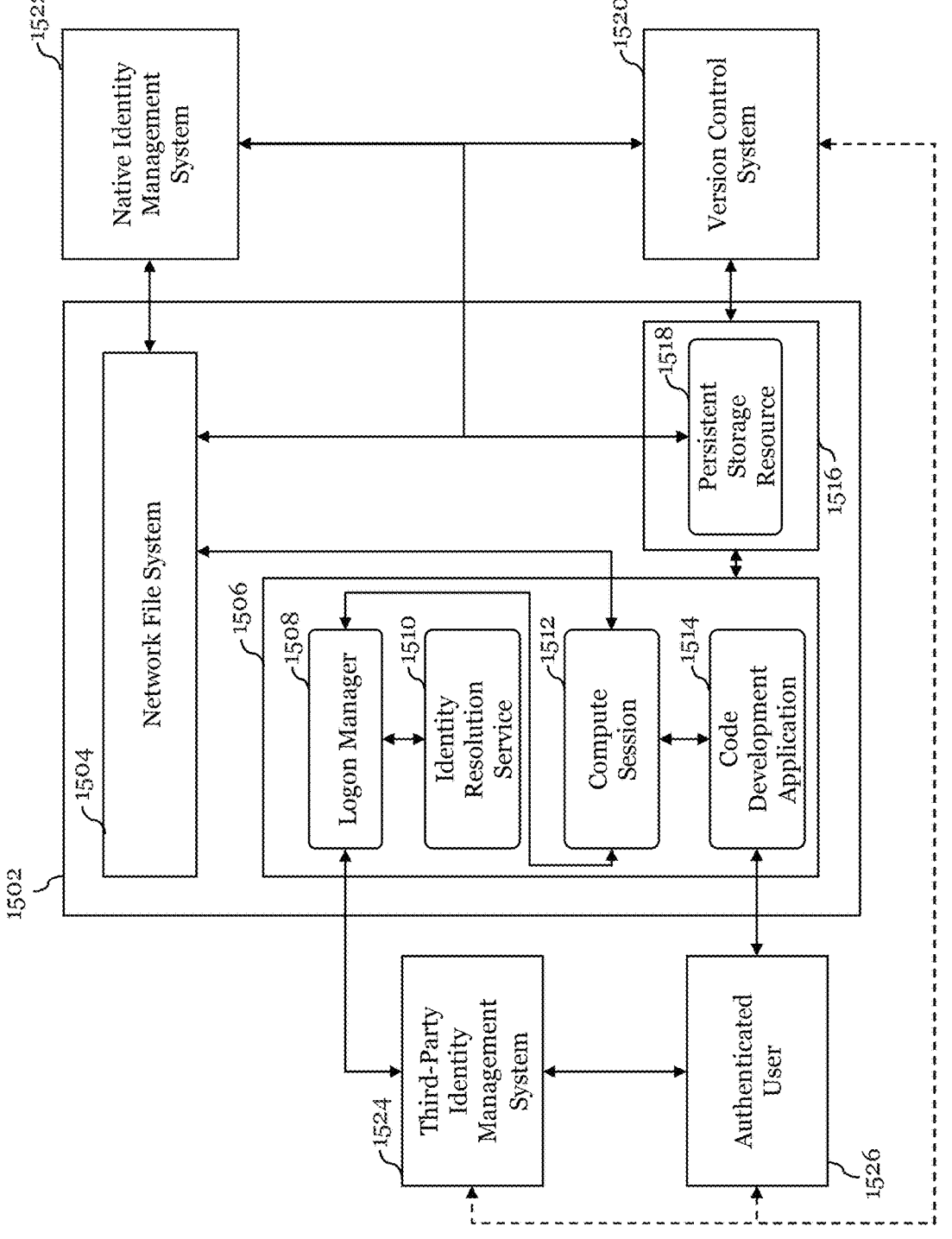

FIG. 15A illustrates an example system that enables version control integration in cross-domain-based authentication systems, according to some embodiments of the present technology.

Figure 15B:
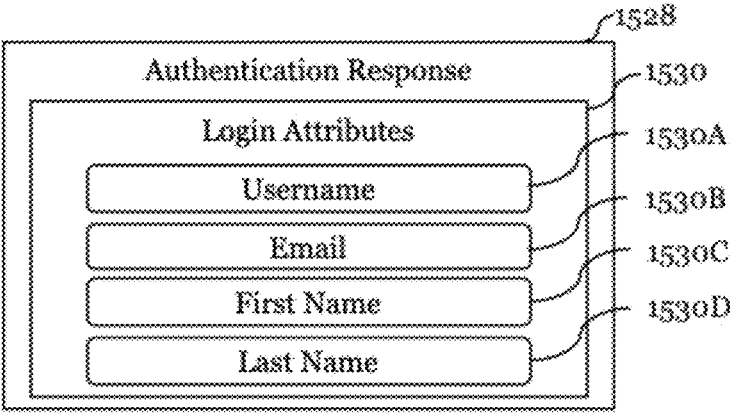

FIG. 15B illustrates an example authentication response according to some embodiments of the present technology.

Figure 15C:
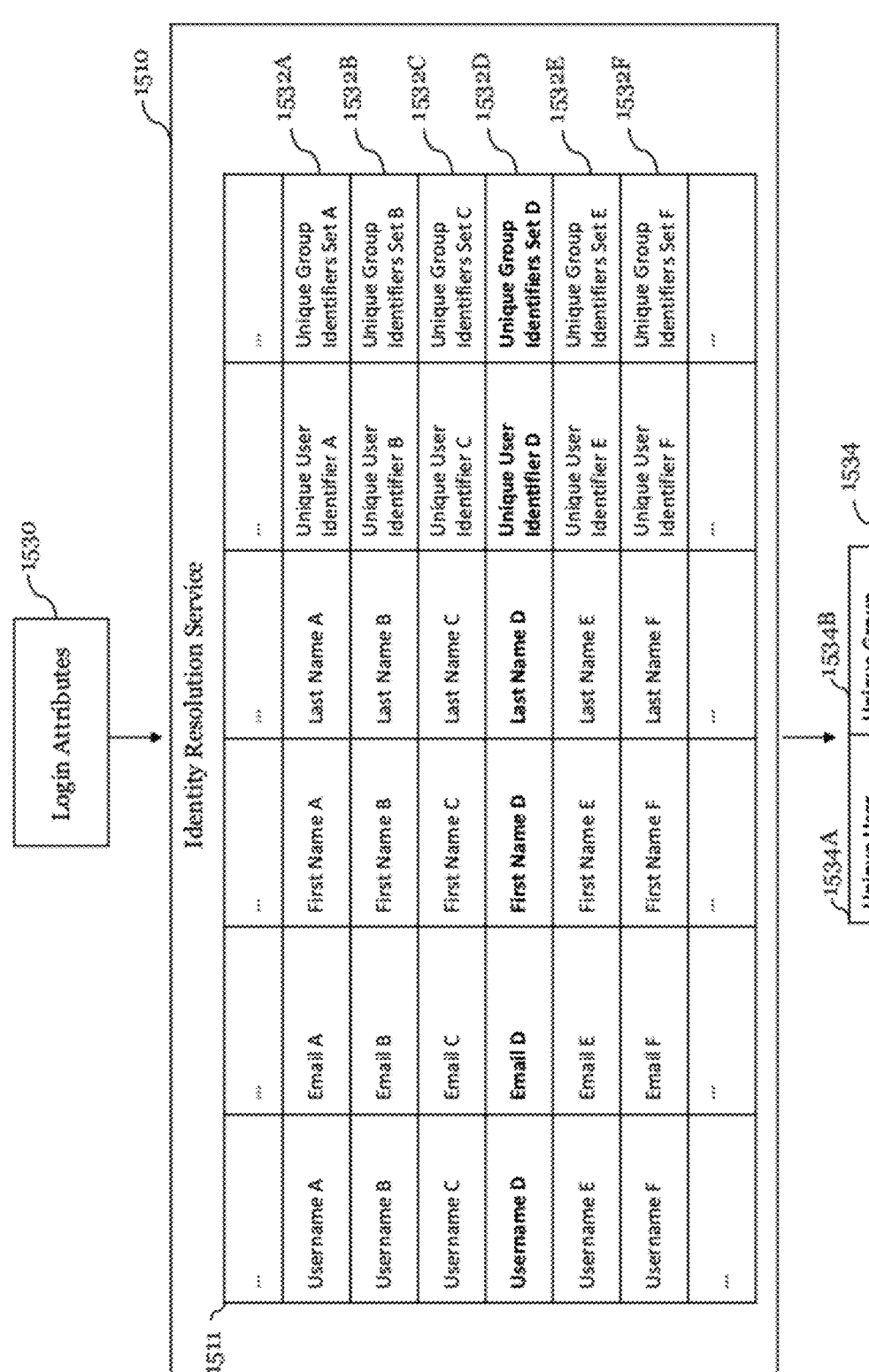

FIG. 15C illustrates an example identity attribute retrieval procedure according to some embodiments of the present technology.

Figure 15D:
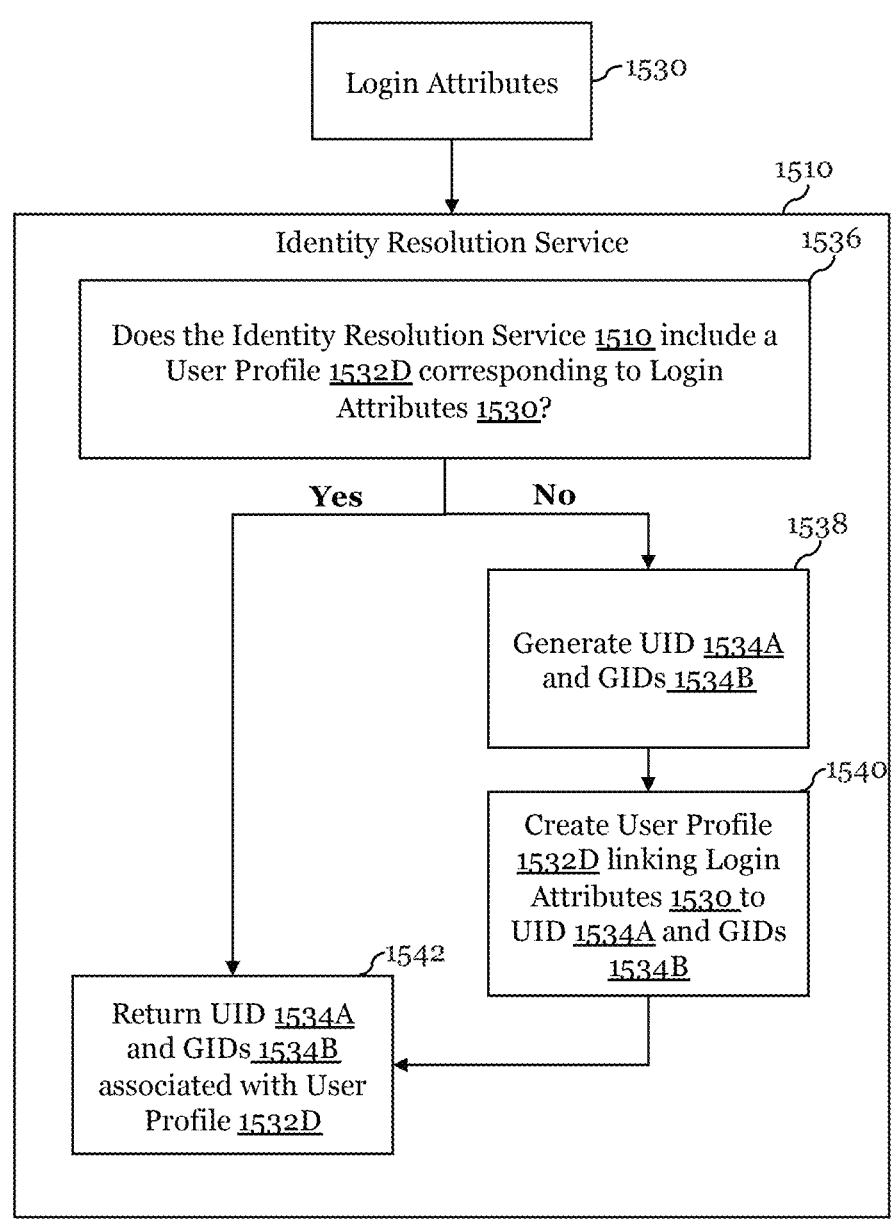

FIG. 15D illustrates an example identity attribute resolution procedure according to some embodiments of the present technology.

Figure 15E:
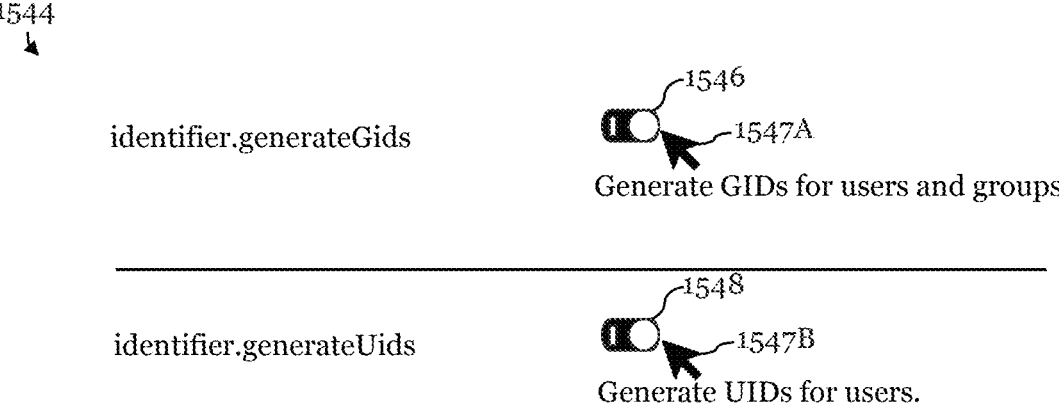

FIG. 15E illustrates an example identity attribute configuration procedure according to some embodiments of the present technology.

Figure 15F:
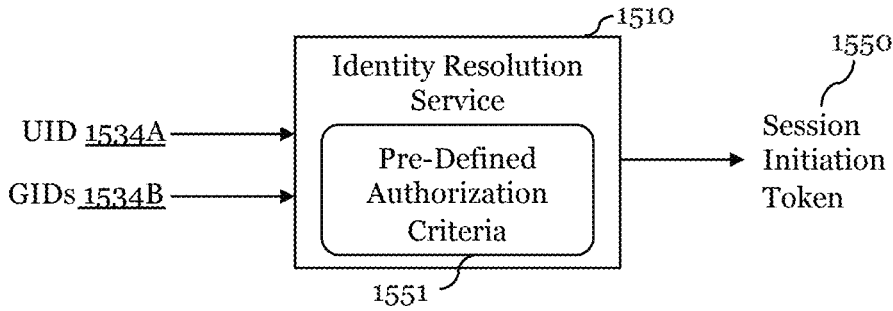

FIG. 15F illustrates an example session initiation token generation procedure according to some embodiments of the present technology.

Figure 15G:
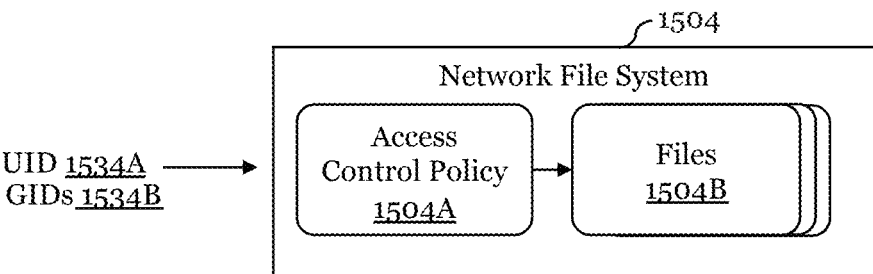

FIG. 15G illustrates a network file system access procedure according to some embodiments of the present technology.

Figure 15H:
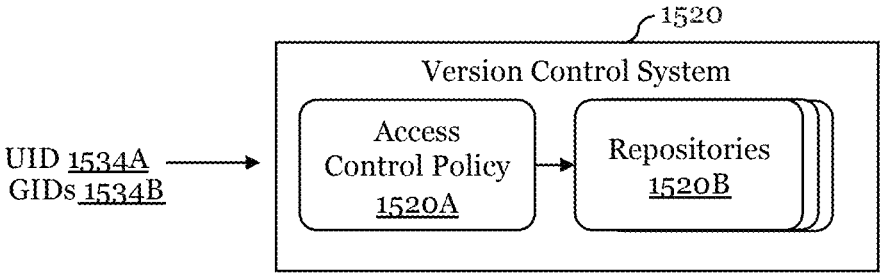

FIG. 15H illustrates an example version control system access procedure according to some embodiments of the present technology.

Figure 15I:
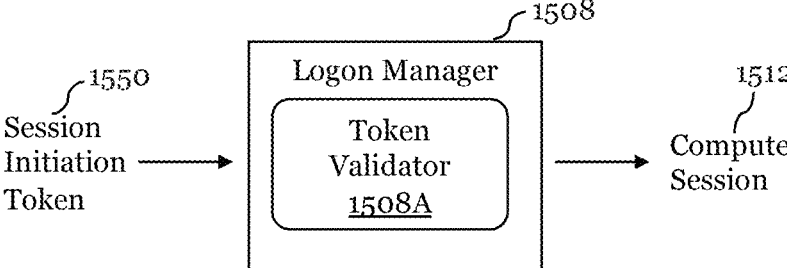

FIG. 15I illustrates an example token validation procedure according to some embodiments of the present technology.

Figure 15J:
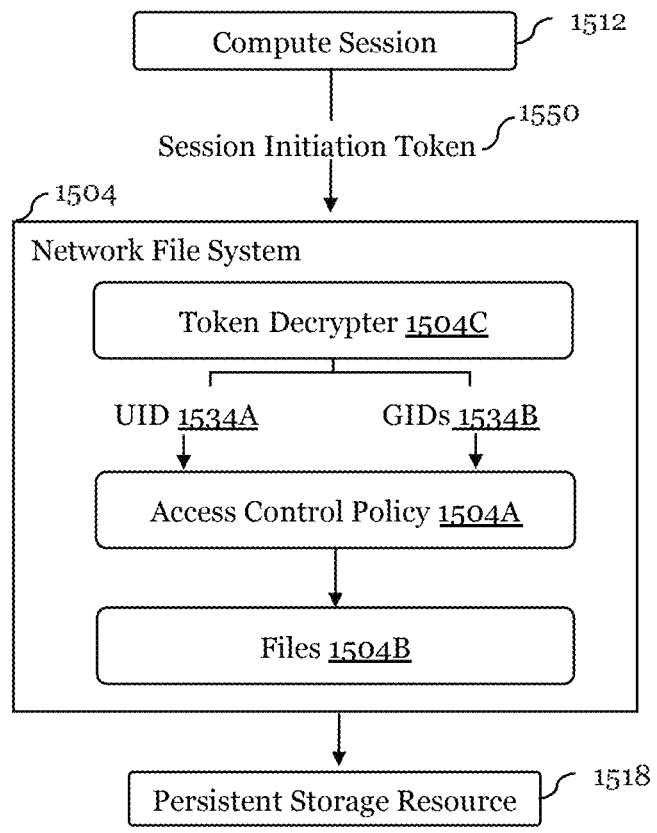

FIG. 15J illustrates an example persistent storage resource access procedure, according to some embodiments of the present technology.

Figure 15K:
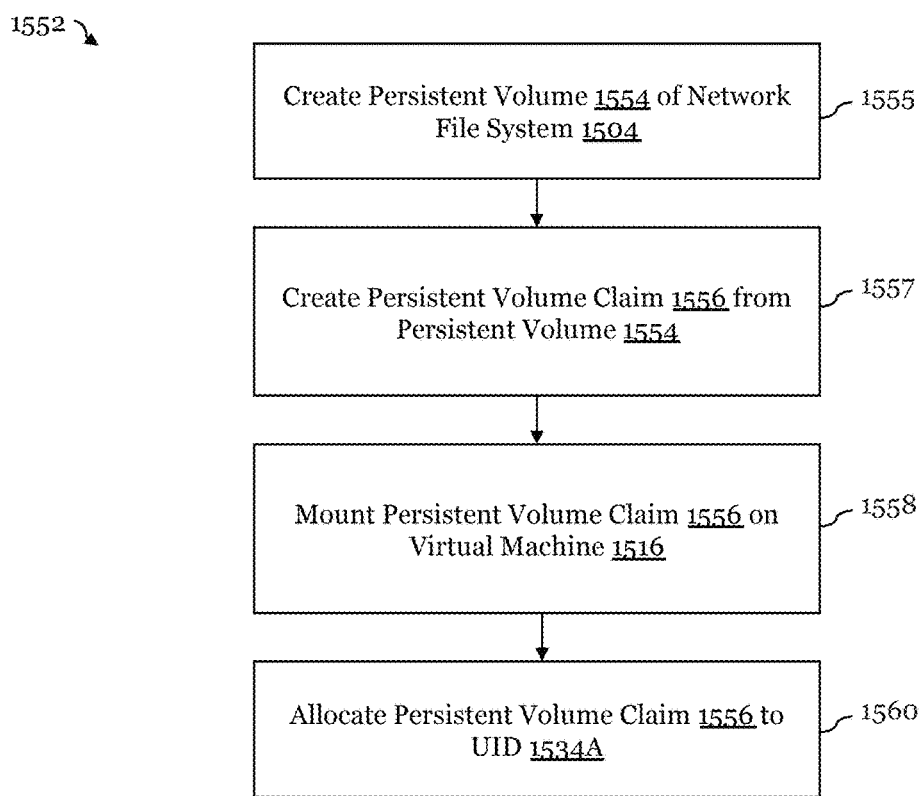

FIG. 15K illustrates an example persistent volume allocation procedure according to some embodiments of the present technology.

Figure 15L:
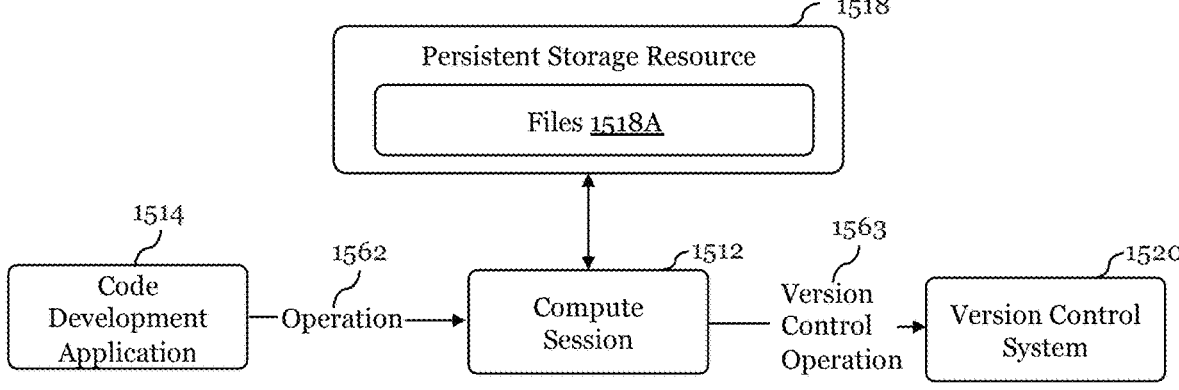

FIG. 15L illustrates an example version control operation procedure according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

EXAMPLE SYSTEMS

Systems depicted in some of the figures may be provided in various configurations. In some embodiments, the systems may be configured as a distributed system where one or more components of the system are distributed across one or more networks in a cloud computing system.

Figure 1:
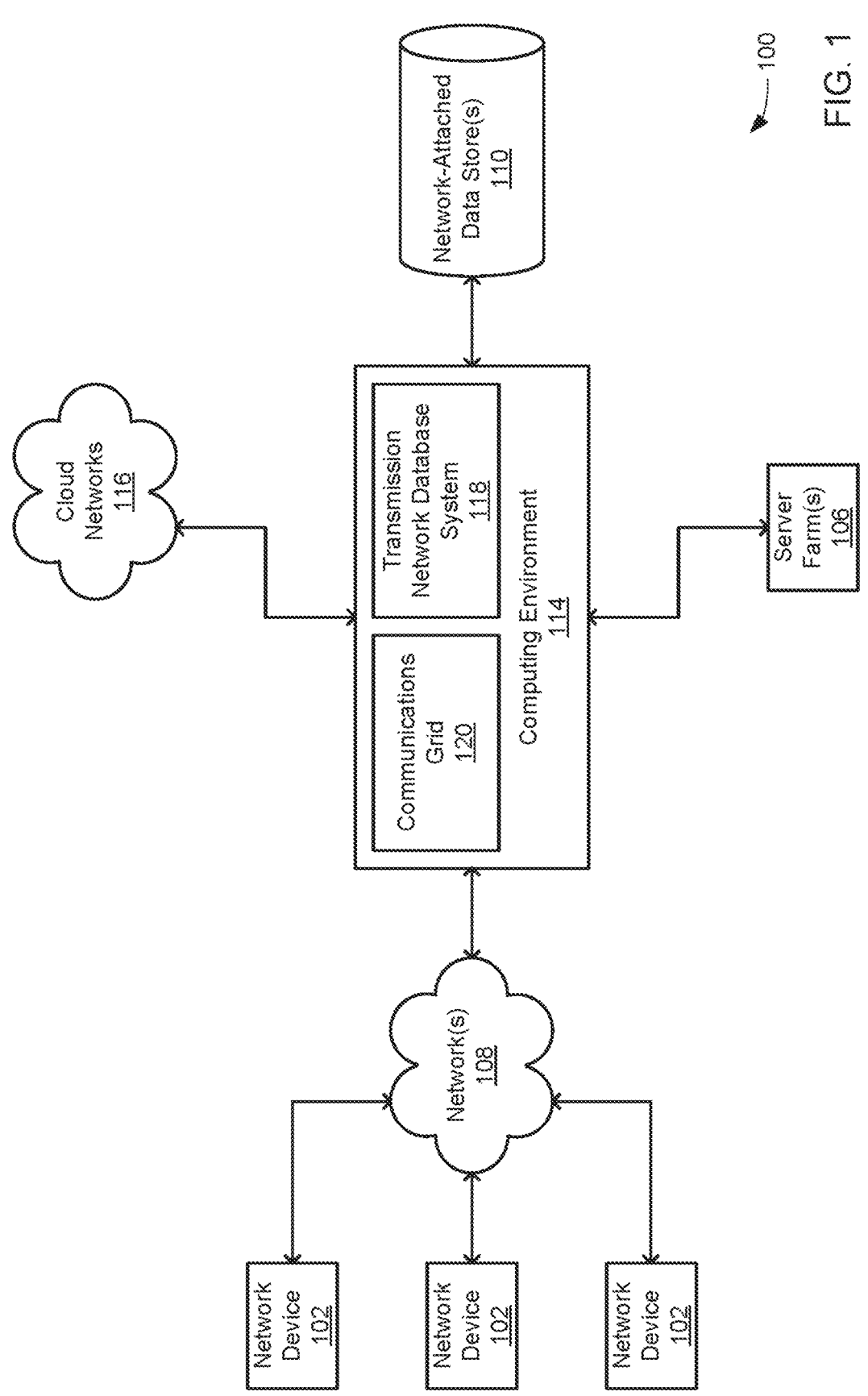
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
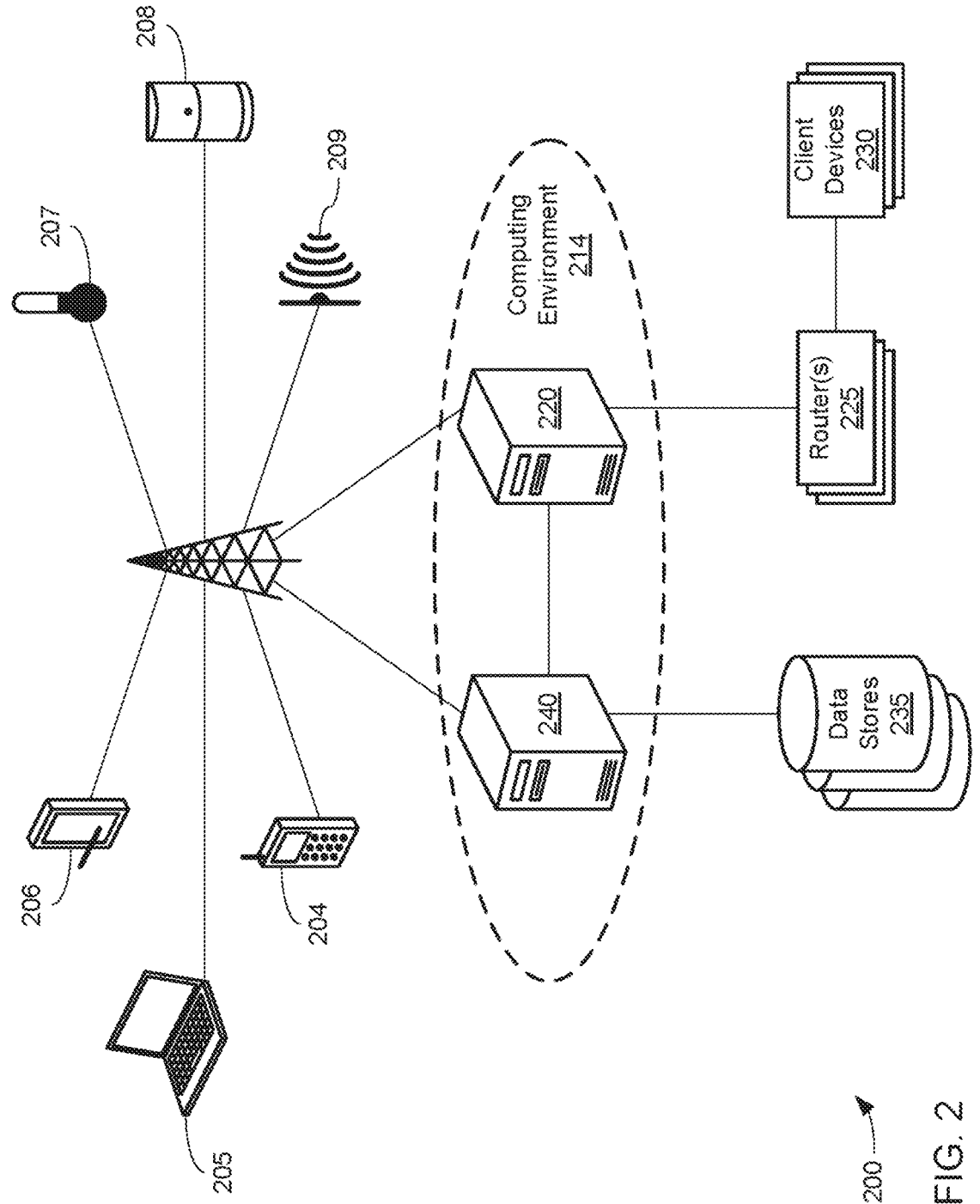
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
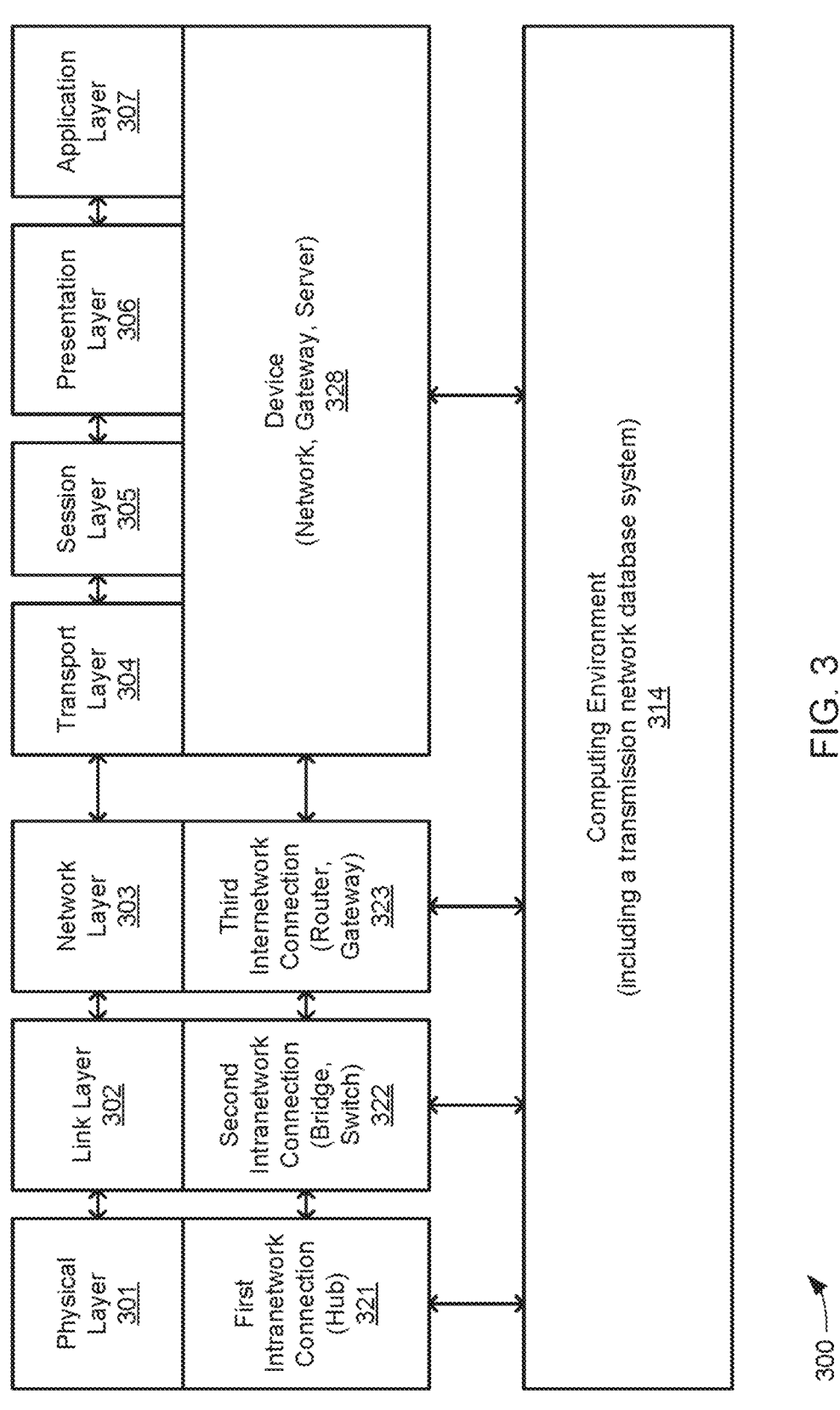
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data and is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
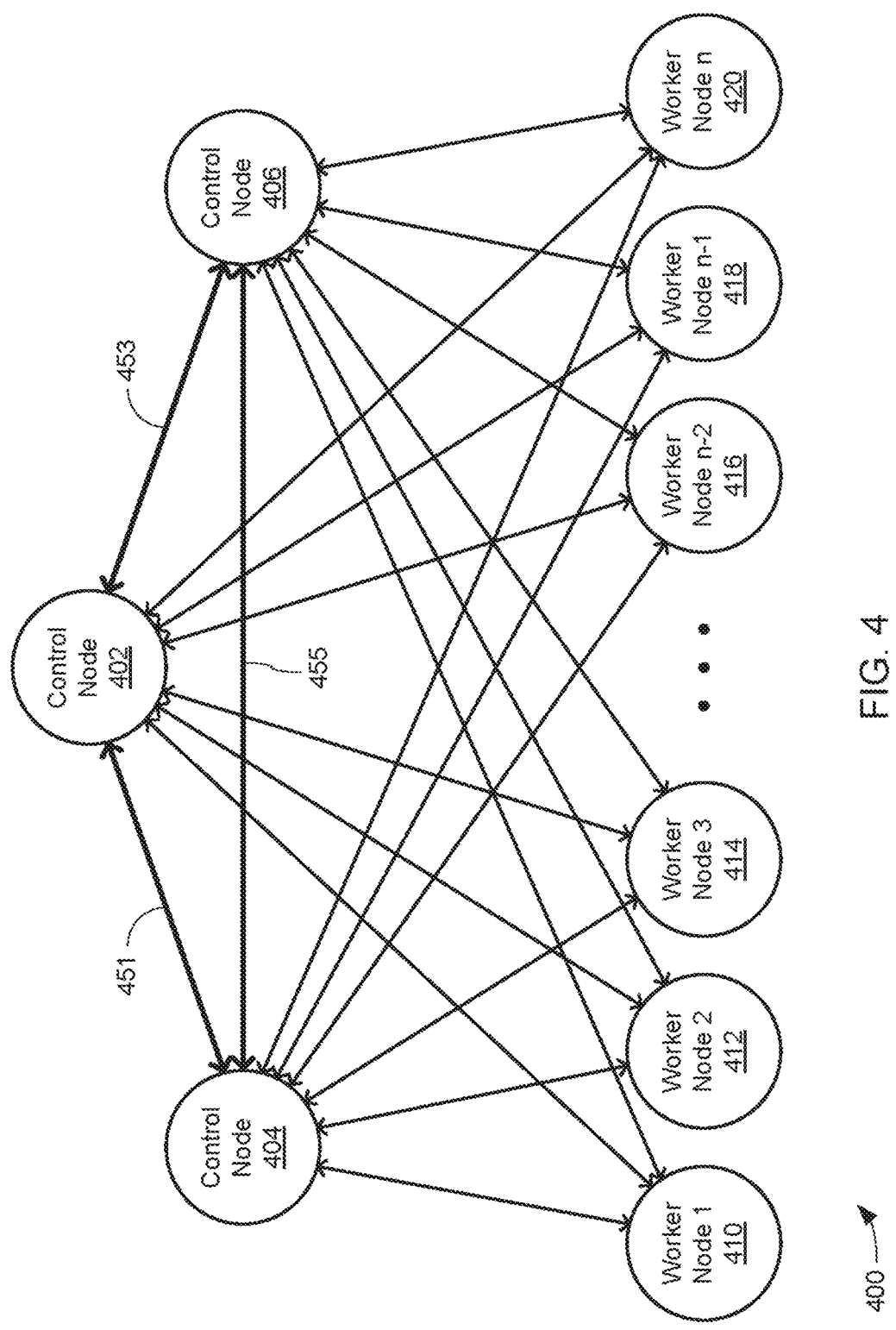
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recently saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
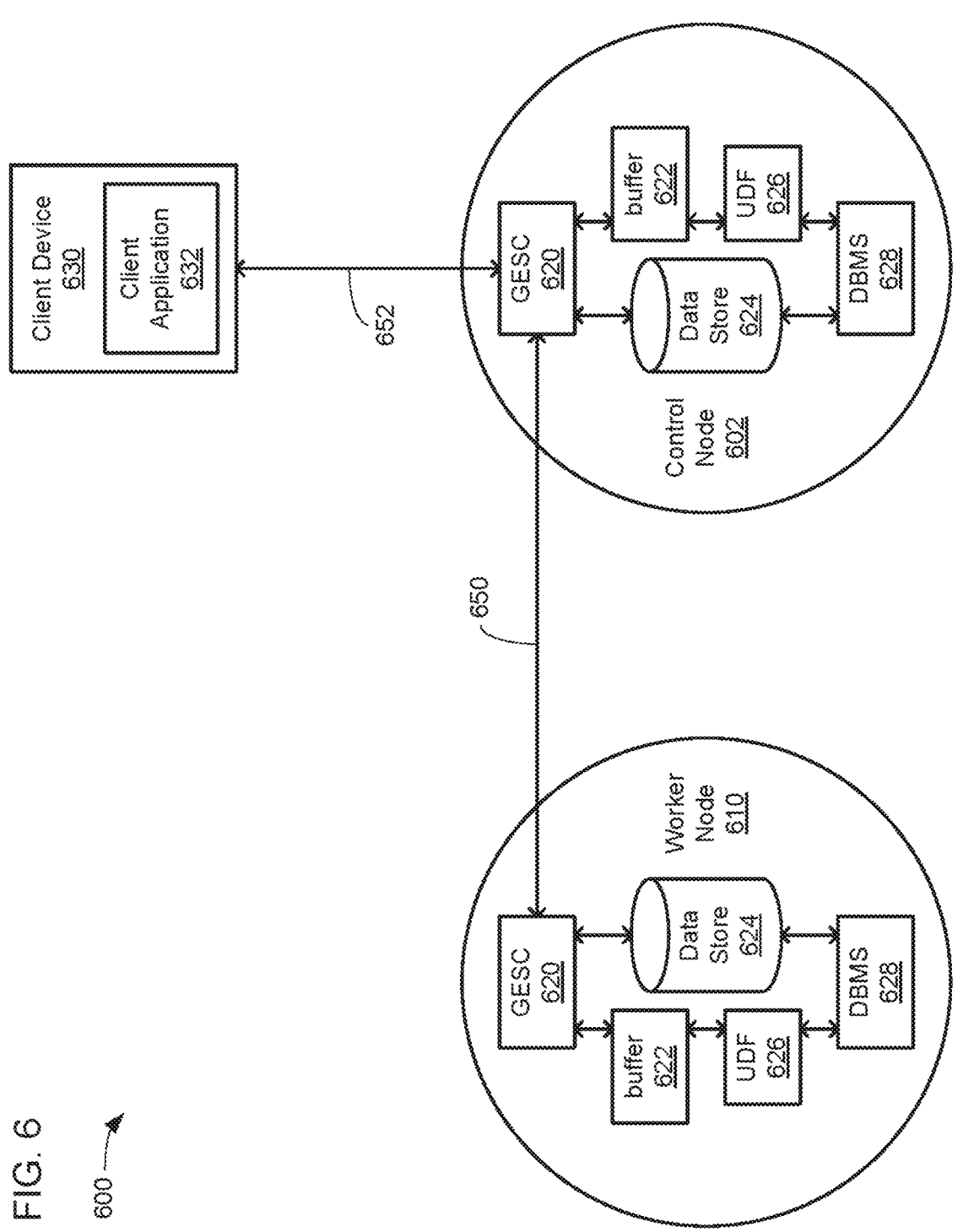
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
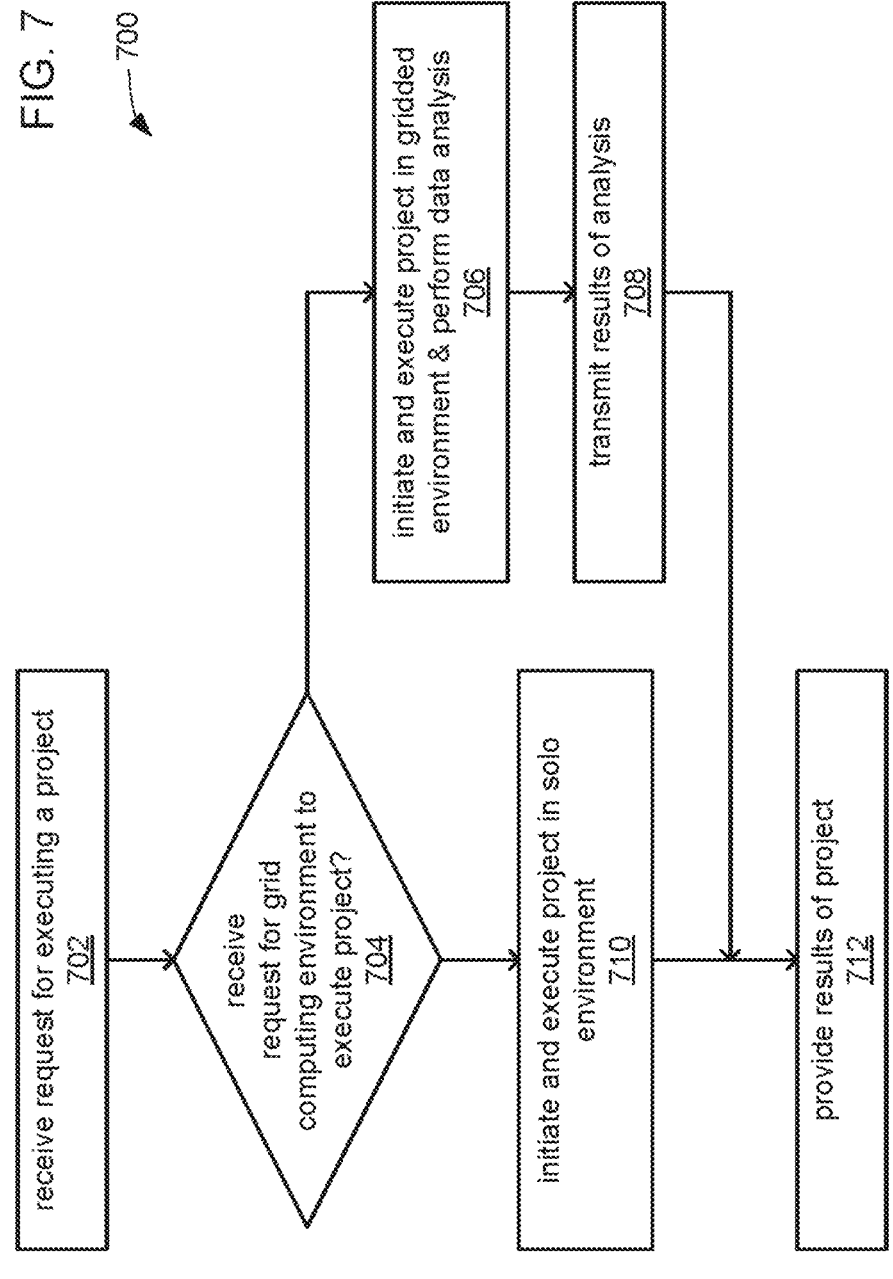
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Clients or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, o)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

A cloud-based service may enable a client device to perform computing tasks without relying on local resources. Some such computing tasks may involve accessing and modifying files, which may be facilitated by a network file system of the cloud-based service. To support version control for these files, the cloud-based service may incorporate version integration tools (e.g., Git). Additionally, the cloud-based service may use authentication to ensure that only authorized users (e.g., users of the client device) may access protected resources of the cloud-based service. In some such examples of authentication, the cloud-based service may use third-party identity management systems (e.g., third-party identity providers) to authenticate users and/or client devices across applications according to a respective protocol (e.g., a System for Cross-domain Identity Management (SCIM) protocol).

Challenges may arise when version control relies on file-level access managed by a network file system that uses user identifiers (UIDs) and group identifiers (GIDs). These identifiers may be issued by an identity management system (e.g., a native identity management system) distinct from the third-party identity management system. If the third-party identity management system does not provide UID and/or GID attributes when a user is being authenticated, authentication may fail at the file system level due to a failure to provide UID and/or GID attributes. As a result, users may appear authenticated, but may be unable to read, write, or manage repositories stored in persistent volumes mounted over the network file system.

For instance, an authenticated user may successfully log into a development environment supported by the cloud-based service via a third-party identity management system and may be able to clone a repository. However, actions like committing or pushing changes may fail due to a UID mismatch. This may occur because the third-party identity management system may not supply the UID or GID used by the network file system for authorization.

Existing cloud-based services may operate under the assumption that each system or module of a cloud-based service (e.g., a version control system, a file system, nodes of a container cluster) uses a unified identity format. However, when multiple identity management systems are employed with a cloud-based service, each providing identity attributes in a respective format, this assumption may break down and errors in authentication may occur. As a result, techniques may be needed that enable the use of multiple identity management systems within a cloud-based service.

The system described herein introduces an identity resolution service that generates UID and/or GID attributes for users authenticated via a third-party identity management system. When a user attempts to perform a login (e.g., a login to a development environment supported by the cloud-based service), the third-party identity management system may provide an authentication token including identity attributes (e.g., login attributes) to a logon manager that, in turn, provides the identity attributes to the identity resolution service. The identity resolution service may fetch existing UIDs and/or GIDs associated with the login attributes or may generate new UIDs and/or GIDs.

The UIDs and/or GIDs may be embedded into a session initiation token and may be passed downstream to a compute session, where the compute session may provide the session initiation token to the network file system. Because the session initiation token includes valid UIDs and/or GIDs, the network file system may be able to successfully perform authentication. It may do so by referencing an access control list that recognizes UIDs and/or GIDs provided by the compute session as well as the native identity management system.

Overall, the techniques described herein provide a secure, scalable, and resource-efficient solution for incorporating version control integration into cloud-based services that utilize multiple identity management systems. For instance, utilizing an identity resolution service to generate and manage UIDs and/or GIDs may mitigate the risk of access errors caused by identities with mismatched formats, enabling more reliable integration between cloud-based services and third-party identity management systems.

FIG. 14 illustrates one embodiment of method 1400 for version control integration in cross-domain-based authentication systems. It shall be appreciated that other embodiments contemplated within the scope of the present disclosure may involve more processes, fewer processes, different processes, or a different order of processes than illustrated in FIG. 14. It should be noted that a computer-program product may include a non-transitory machine-readable storage medium storing computer instructions that, when executed by one or more operations, may perform operations corresponding to the processes and sub-processes of method 1400. Additionally, or alternatively, a computer-implemented method may include operations corresponding to processes and sub-processes of 1400. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 1400.

As described herein with reference to FIG. 15A, a system may include a cloud service 1502 (e.g., Azure, AWS, GCP), a third-party identity management system 1524 (e.g., a single sign on (SSO) identity management system configured using Security Assertion Markup Language or OpenID Connect) and a native identity management system 1522 (e.g., a lightweight directory access protocol (LDAP) identity management system) where the one or more identity management systems have a communication connection with the cloud service 1502. In some examples, LDAP identity management systems may be configured to manage and verify LDAP user identifiers, whereas SSO identity management systems may be configured to manage and verify SSO user identifiers. The LDAP user identifiers may be used for accessing and managing directory data from a directory service, whereas the latter user identifiers may enable authentication across multiple applications with a single login session. Additionally, the system may include an authenticated user 1526 and a version control system 1520 (e.g., Git), where the version control system has a communication connection with the third-party identity management system 1524 and the native identity management system 1522 as well as the authenticated user 1526 (e.g., an end user). Additionally, the authenticated user 1526 may have a communication connection with the third-party identity management system 1524.

The cloud service 1502 may include a network file system 1504 (e.g., Azure NetApp Files implementing NFSv3, NFSv4, NFSv4.1, or NFSv4.2), a container cluster 1506 (e.g., a Kubernetes cluster), and a virtual machine 1516 (e.g., a Linux machine) that includes a persistent storage resource 1518 (e.g., a cache along with non-volatile memory). The container cluster 1506 may include nodes executing a logon manager 1508, an identity resolution service 1510, a compute session 1512, and a code development application 1514. Network file system 1504 may have respective communication connections with native identity management system 1522, version control system 1520, persistent storage resource 1518, and compute session 1512 of container cluster 1506. Virtual machine 1516 may have respective communication connections with version control system 1520 and container cluster 1506. Logon manager 1508 may have respective communication connections with third-party identity management system 1524, identity resolution service 1510, and compute service 1512. Additionally, code development application 1514 may have respective communication connections with authenticated user 1526 and code development application 1514.

The network file system 1504 may have an access control policy (e.g., an access control list) that authorizes users with a particular user identifier (UID) or one or more group identifiers (GIDs). For instance, a user may perform an authentication procedure with native identity management system 1522 and native identity management system 1522 may provide the UID and/or one or more GIDs associated with the user. The network file system 1504 may verify that the UID and/or one or more GIDs have access according to the access control policy and may grant the user access to files of the network file system 1504, where the user may perform operations on the files, including version control operations (e.g., via version control integration).

Version control integration, however, may fail if a third-party identity management system (e.g., third-party identity management system 1524) provides cross-domain-based identifiers (e.g., System for Cross-Domain Identity Management (SCIM) identifiers) to the network file system 1504. For instance, the tokens provided by the native identity management system 1522 may include the UID and the one or more GIDs in a particular format, whereas tokens provided by the third-party identity management system may fail to include the UID and/or the one or more GIDs in that format or may fail to include the UID and/or the one or more GIDs entirely. If a token received from the third-party identity management system fails to include a UID and/or one or more GIDs in a same format as the other identity management system or if the UID and/or one or more GIDs are missing completely, authentication may fail may when the server implementing the network file system attempts to authenticate the user using the access control policy. For instance, authentication may fail when an access control list (e.g., an access control policy) is applied on a file directory, as cross-domain-based identifiers (e.g., SCIM identifiers) may fail to supply UID and GIDs as user attributes.

The techniques described herein may prevent authentication from failing in the manner described by enabling UID and/or GID generation for cross-domain based identities received from the third-party identity management system. For instance, one or more nodes of container cluster 1506 may perform generation of UID and/or one or more GIDs when receiving a token from a third-party identity management system 1524 and may then provide the associated one or more UIDs and/or GIDs to network file system 1504 such that network file system 1504 may treat tokens from a third-party management system 1524 in a similar manner as tokens from native identity management system 1522. Additionally, the techniques described herein may include adding access control policies to a persistent storage resource (e.g., persistent storage resource 1518) for generated identifiers and/or portable operating system interface (POSIX) identifiers and isolating the native identity management system 1522 from the container cluster (e.g., container cluster 1508). Applying these techniques may enable users to perform a version control operation from the backend and/or a code development application 1514. It may further resolve compatibility issues associated with generated UIDs and/or GIDs as compared to UIDs and/or GIDs provided by a native identity management system 1522 and may enable the use of SCIM IDs for version control integration.

Additionally, one of ordinary skill in the art will appreciate that method 1400 may provide many technical advantages and practical applications over other designs for cross-domain-based identifier authentication. For instance, a server implementing a network file system may interact with multiple users simultaneously. If the server is encoded with logic to resolve discrepancies between identifiers received from different identity management systems (e.g., converting a received identifier into a recognized format), a latency associated with the server's operations may be increased. Additionally, the server may use additional computational resources in order to resolve the discrepancies. Having other systems (e.g., an identity resolution service) perform the conversion of a received identifier into a recognized format may reduce burden on the network file system. Accordingly, the network file system may perform corresponding operations with reduced latency and/or fewer computational resources.

The techniques described herein may result in improved network performance by mitigating a risk that the cloud service errantly denies access to a user with credentials that should enable the user to utilize the cloud service (e.g., for modifying files at a remote location). For instance, the generation of UIDs and/or GIDs may enable the cloud service to be integrated with a third-party identity management system that provides identifiers that may not initially conform to a format expected from a network file system. Such integration may reduce a risk that the cloud service errantly denies access to the user. Hence, an overall performance of the cloud service may be improved.

As shown in FIG. 14, process 1410 of method 1400 may receive, from a third-party identity management system, an authentication response indicating a set of login attributes for an authenticated user. The term "identity management system" may refer to a system that creates, stores, and manages digital identities and authentication credentials (e.g., an identity provider). Such systems may be configured to verify received digital identities and to provide authentication tokens to applications or services that provide the digital identities. The term "third-party identity management system" may refer to an identity management system distinct from a native identity management system, where a "native identity management system" may refer to a primary or default identity management system that a network file system is configured to communicate with. The term "authentication response" may refer to a message (e.g., an authentication token) provided by the third-party identity management system that indicates that a particular user is authenticated and may include login attributes associated with the particular user. The term "login attributes" may refer to specific types of data (e.g., an email address, a username, a first name, and/or a last name associated with an authenticated user) that may be used in combination to uniquely identify a user. The term "authenticated user" may refer to a user that has successfully passed an authentication procedure performed by the third-party identity management system (e.g., the authentication procedures provided by the user are valid).

In a non-limiting example, as depicted in FIG. 15A, an authenticated user 1526 may provide authentication credentials to the third-party identity management system 1524 (e.g., username, password, email, first name, last name) via logon manager 1508. The third-party identity management system 1524 may verify the authentication credentials and may provide an authentication response (e.g., an authentication token) to logon manager 1508 with the associated login attributes 1530 for the user.

Logon manager 1508 may, in some examples, be implemented by one or more nodes within a container cluster 1506 (e.g., a Kubernetes cluster), where a node may refer to a physical or virtual machine that runs a particular application workload and a container cluster 1506 may refer to a set of nodes that run a containerized application (e.g., logon manager 1508). It should be noted that the container cluster 1506 may include other nodes that implement other functionalities and/or applications (e.g., identity resolution service 1510, compute session 1512, and code development application 1514).

In another non-limiting example, FIG. 15B may depict an authentication response 1528 (e.g., an authentication response received from a third-party identity management system 1524). The authentication response 1528 may include a set of login attributes 1530, where the set of login attributes 1530 may include one or more of username 1530A, email 1530B, first name 1530C, or last name 1530D (e.g., of authenticated user 1526 as depicted in FIG. 15A).

As shown in FIG. 14, process 1420 of method 1400 may obtain, from an identity resolution service, a set of identity and authorization attributes for the authenticated user using the set of login attributes. The set of identity and authorization attributes may at least include a unique UID and one or more unique GIDs associated with the authenticated user. The term "identity resolution service" may refer to one or more nodes of a container cluster that execute an application for mapping a received set of login attributes to a set of identity and authorization attributes and providing the set of identity and authorization attributes to one or more applications (e.g., to a logon manager). The term "identity and authorization attributes" may refer to one or more types of data that a system (e.g., a network file system, a version control system) may use to identify and authorize a user for requesting access to the system. Such attributes may include a user identifier (UID), one or more group identifiers (GIDs), or both. A UID may refer to a unique identifier indicating a particular user. A GID may refer to a unique identifier indicating a group of users. The GID may represent privileges of a group or collection of users that can perform certain actions via or with the one or more nodes (e.g., create actions). A user may have one UID and one or more GIDs. Each of a UID or GID may be associated with certain roles or privileges (e.g., access to particular set of files or resources, access to a particular set of operations performed by an application or a system, access to particular applications or systems, permission to spawn a compute session).

In a non-limiting example, as described with reference to FIG. 15A, an identity resolution service 1510 of container cluster 1506 may obtain a set of login attributes 1530 from logon manager 1508 and may provide, to logon manager 1508, a set of identity and authorization attributes 1534 associated with authenticated user 1526. It should be noted that logon manager 1508 may provide the entire authentication response 1528 including the login attributes 1530 or may extract the login attributes 1530 from the authentication response 1528 and may provide the set of login attributes 1530 to identity resolution service 1510. Alternatively, it should be noted, without deviating from the present disclosure, that there may be examples where the identity resolution service 1510 directly receives the authorization response 1528 including the login attributes 1530 from third-party identity management system 1524.

In some examples, the UID associated with the authenticated user corresponds to a system-generated identifier that uniquely represents an identity of the authenticated user in a target system. For instance, in a non-limiting example as described with reference to FIG. 15A, identity resolution service 1510 may generate a UID 1534A for authenticated user 1526, where the UID 1534A represents an identity of authenticated user 1526 within one or more of network file system 1504, compute session 1512, virtual machine 1516, or version control system 1520. Additionally, or alternatively, the one or more unique GIDs 1534B associated with authenticated user 1526 may correspond to system-generated identifiers that uniquely represent permissions of the authenticated user 1526 in the target system. For instance, in other non-limiting examples as described with reference to FIG. 15A, identity resolution service 1510 may generate one or more GIDs 1534B for authenticated user 1526, where the GIDs 1534B uniquely represent permissions of the authenticated user 1526 in one or more of network file system 1504, compute session 1512, virtual machine 1516, or version control system 1520.

In some examples, obtaining the set of identity and authorization attributes includes searching an identity resolution service for a user profile corresponding to the set of login attributes and, after searching the identity resolution service for the user profile, retrieving the unique UID and the one or more GIDs from the user profile. The term "user profile" may refer to a data structure that defines or encapsulates attributes associated with a particular user (e.g., the authenticated user). In some examples, the data structure may be defined as a row in a table (e.g., within a memory accessible by the identity resolution service).

In a non-limiting example, as described with reference to FIG. 15C, identity resolution service 1510 may receive login attributes 1530 (e.g., from logon manager 1508). The identity resolution service may query a table 1511 using the login attributes 1530 to identify a particular row (e.g., one of rows 1532A, 1532B, 1532C, 1532D, 1532E, or 1532F) with attributes matching that of the login attributes 1530 (e.g., a same username, a same email, a same first name, and/or a same last name). For instance, in the present example, the identity resolution service 1510 may select row 1532D and may output a set of identity and authorization attributes 1534 including UID 1534A and one or more GIDs 1534B stored at row 1532D. The identity resolution service 1510 may output the associated set of identity and authorization attributes 1534 within an identity and authorization message that the identity resolution service 1510 provides to logon manager 1508.

It should be noted that there may be examples in which the identity resolution service fails to locate a matching user profile associated with the provided login attributes (e.g., due to this being the first time the third-party identity management system is providing an authentication response for the particular user). For instance, the identity resolution service may detect that the identity resolution service does not include a user profile corresponding to the set of login attributes and, in response, may automatically generate the UID and one or more GIDs for the associated user and may create the user profile that associates the set of login attributes with the UID and the one or more GIDs. The identity resolution service may then return, in a response from the identity resolution service, the UID and the one or more GIDs.

In a non-limiting example, as described with reference to FIG. 15D, identity resolution service 1510 may receive login attributes 1530 (e.g., from logon manager 1508). At 1536, the identity resolution service 1510 may attempt to locate a user profile (e.g., user profile 1532D) corresponding to login attributes 1530 (e.g., may query a table to locate a row corresponding to one or more of login attributes 1530). If the identity resolution service 1536 succeeds, the identity resolution service 1536 may extract the UID and GID from the located user profile (e.g., may extract UID 1534A and one or more GIDs 1534B from user profile 1532D as depicted in FIG. 15C) and may return the extracted UID and one or more GIDs at 1542 (e.g., to logon manager 1508). If the identity resolution service 1510 fails to locate a corresponding user profile (e.g., due to no row with matching login attributes existing within the queried table), the identity resolution service 1510 at 1538 may generate a UID and one or more GIDs corresponding to the login attributes (e.g., UID 1534A and one or more GIDs 1534B). The identity resolution service 1510, at 1540, may create a user profile (e.g., user profile 1532D) linking the login attributes 1530 to the generated UID and one or more GIDs (e.g., may add a row to a table corresponding to user profile 1532D) and may return the generated UID and one or more GIDs at 1542 (e.g., to logon manager 1508).

In some examples, before the authentication response is received from the third-party identity management system (e.g., at 1410), one or more nodes of a container cluster (e.g., one or more nodes executing functions associated with a logon manager or an identity resolution service) may receive, via a user interface, user input activating an automatic UID generator control element and an automatic GID generator control element. Additionally, in response to receiving the user input, the one or more nodes may configure the identity resolution service to generate the UID and the GID for the authenticated user when the set of login attributes are new to the identity resolution service. The set of login attributes being new may refer to a scenario in which the identity resolution fails to detect a user profile corresponding to the login attributes as described herein.

The user interface may be an example of a graphical user interface (GUI) that visually displays the automatic UID generator control element and the automatic GID generator control element. When the user interacts with the automatic UID generator control element, the system hosting the GUI may provide a signal to the one or more nodes indicating that the identity resolution service is to automatically generate a UID when a user profile is created. When the user interacts with the automatic GID generator control element, the system hosting the GUI may provide a signal to the one or more nodes indicating that the identity resolution service is to automatically generate one or more GIDs when a user profile is created. It should be noted that there may be examples where a single control element performs the functionality of both the UID generator control element and the automatic GID generator control element. Additionally, it should be noted that there may be examples where the user interface may be a command line interface (CLI) or an application programming interface (API). In such examples, the user may provide textual commands or call functions that indicate to the system hosting the user interface to provide signaling to the one or more nodes indicating that identity resolution service is to automatically generate the UID and/or the one or more GIDs when a user profile is created.

In a non-limiting example, as described with reference to FIG. 15E, a user interface 1544 may include an automatic GID generator control element 1546 (e.g., a toggle button or the like) and an automatic UID generator control element 1548 (e.g., a toggle button or the like). When a user provides user input 1547A to the automatic GID generator control element 1546 (e.g., by clicking a mouse while a mouse icon is hovering over the automatic GID generator control element 1546), a system hosting the user interface 1544 may transmit a signal indicating for an identity resolution service (e.g., identity resolution service 1510 of FIG. 15A) to automatically generate one or more GIDs when a user profile is created. Additionally, or alternatively, when a user provides user input 1547B to automatic UID generator control element 1548 (e.g., by clicking a mouse while a mouse icon is hovering over the automatic UID generator control element 1548), a system hosting the user interface 1544 may transmit a signal indicating for an identity resolution service (e.g., identity resolution service 1510) to automatically generate a UID when a user profile is created.

In examples in which a user indicates, via the automatic GID generator control element and the automatic UID generator control element, to not automatically generate GIDs and/or UIDs for new login attributes, the identity resolution service may provide an indication of a rejection or an error to the user, as the provided login attributes do not match an existing user profile. Additionally, in such examples, the identity resolution service may refrain from generating and outputting identity and authorization attributes for the provided login attributes. In examples which the user indicates to automatically generate one of UIDs and/or GIDs, the identity resolution service may generate the one of the UIDs and/or GIDs when receiving new login attributes but may refrain from generating the other.

In some examples, data (e.g., data from a file) may be provided to the identity resolution service that includes an indication of login attributes for each user of a list of users of a third party identity management system (e.g., all users within a particular group, all users of the third party identity management system). In such examples, the identity resolution service may generate (e.g., in bulk) UIDs and/or one or more GIDs for each user within the list and may store the login attributes as well as the UIDs and/or one or more GIDs in associated user profiles.

As shown in FIG. 14, process 1430 of method 1400 may grant, by the identity resolution service, a session initiation token when the set of identity and authorization attributes satisfy predefined authorization criteria. The term "session initiation token" may refer to a token (e.g., provided by the identity resolution service) that indicates to initiate a session, where a session may refer to a period in which a user interacts with a cloud service (e.g., cloud service 1502). The term "authorization criteria" may refer to a set of rules, conditions, and attributes that determine whether a user is permitted access to a specific resource (e.g., to a network file system). The authorization criteria being predefined may refer to the authorization criteria being defined prior to obtaining the authentication response at 1410 (e.g., in one or more memories accessible to the identity resolution service).

In a non-limiting example, as described with reference to FIG. 15F, identity resolution service 1510 may receive UID 1534A and/or one or more GIDs 1534B (e.g., from logon manager 1508 or directly from a previous operation in which the identity resolution service 1510 extracts or generates UID 1534A and/or one or more GIDS 1534B). Upon receiving UID 1534A and/or one or more GIDs 1534B, identity resolution service 1510 may determine if the UID 1534A and/or one or more GIDs 1534B satisfy pre-defined authorization criteria 1551. If the UID 1534A and/or one or more GIDs 1534B satisfy the pre-defined authorization criteria 1551, identity resolution service 1510 may generate a session initiation token 1550 and may provide the session initiation token to logon manager 1508 (e.g., as depicted in FIG. 15A).

In some examples, the set of identity and authorization attributes satisfy the predefined authorization criteria when the one or more GIDs correspond to a group authorized to spawn or launch a compute session within the cloud service and/or a group that authorizes access to a network file system linked to a persistent storage resource. In one example, the predefined authorization criteria may indicate that none of the GIDs may have permission to spawn a compute session. In such examples, the GIDs may fail to satisfy the predefined authorization criteria (e.g., no GID that allows a compute session to spawn may be associated with the corresponding authenticated user). Alternatively, the group identifier may authorize access to a system distinct from the network file system. In such examples, the group identifier may likewise fail to satisfy the predefined authorization criteria.

In some examples, the session initiation token encrypts the user identifier and the one or more GIDs associated with the authenticated user. For instance, the session initiation token may include an encrypted version of the user identifier and the one or more GIDs that may be decrypted (e.g., by a network file system) in order to extract and identity the user identifier and the one or more GIDs.

As shown in FIG. 14, process 1440 of method 1400 may perform operations in response to the identity resolution service granting the session initiation token. For instance, as shown in FIG. 14, sub-process 1440A of process 1440 may allocate a compute session to the unique user identifier. The term "compute session" may refer to an active instance of computational resources allocated for performing tasks (e.g., interacting with and managing files of a network file system). A compute session allocated for one user may be independent of a compute session allocated for another user. It should be noted that the compute session may be dedicated to the authorized user and may perform actions such as machine learning tasks, code development tasks, or other tasks. Allocating a computer session may refer to initializing the active instance of computational resources.

In some examples, sub-process 1440A of process 1440 may, in response to the identity resolution service granting the session initiation token, provide the session initiation token to a logon manager application (e.g., a logon manager, such as logon manager 1508 as described herein) and may authorize, by the logon manager application, allocation of the compute session to the unique user identifier based on the session initiation token. Additionally, sub-process 1440A may allocate, by the logon manager application, the compute session to the unique user identifier in response to the authorizing by the logon manager application.

In a non-limiting example, as described with reference to FIG. 15I, logon manager 1508 may receive a session initiation token 1550 (e.g., from identity resolution service 1510) and may validate the session initiation token 1550 via token validator 1508A. Token validator 1508A may determine that token is valid (e.g., that it is not forged, fake, or expired). Once the session initiation token 1508A is validated, the logon manager 1508 may allocate a compute session 1512 to the unique user identifier indicated within the session initiation token. In some examples, the token validator 1508A may decrypt the token to extract the user identifier. In other examples (e.g., in examples in which the identity resolution service 1510 directly provides a UID to logon manager 1508), the logon manager 1508 may provide the UID to token validator 1508A.

As shown in FIG. 14, sub-process 1440B of process 1440 may allocate a persistent storage resource to the unique user identifier. The term "storage resource" may refer to a system or device (e.g., a memory device, computer memory) configured to store and retrieve data. A persistent storage resource may refer to a storage resource that stores information persistently (e.g., the information is still retrievable if the store resource powers down or is restarted). For instance, the storage resource may include non-volatile memory that stores data.

In some examples, allocating the persistent storage resource to the unique UID may include transmitting the session initiation token from the compute session to a network file system and decrypting the session initiation token to extract the unique UID and the one or more GIDs. The term "network file system" may refer to a system implementing a file system protocol that enables users to access and manage files over a network (e.g., to perform an access as though the files are stored on their local machine). In some examples, as illustrated with reference to FIG. 15J, compute session 1512 may transmit a session initiation token 1550 to network file system 1504, where network file system 1504 may decrypt the session initiation token (e.g., via token decrypter 1504C) to extract the unique UID 1534A and the one or more GIDS 1534B.

Additionally, performing the allocation may include determining that the network file system includes a security policy authorizing the unique user identifier and the one or more group identifiers to copy the one or more files in the network file system. The term "security policy" may refer to a data object that defines permissions for a user with a particular UID or for users that have a particular GID. The security policy may be stored at a memory accessible by the compute session. In some examples, the security policy may be referred to as an access control policy. In a non-limiting example, as depicted with reference to FIG. 15J, network file system 1504 may determine that the network file system 1504 has an access control policy 1504A that authorizes UID 1534A and the one or more GIDS 1534B to perform operations on one or more files 1504B in the network file system (e.g., to copy the files 1504B, delete the files 1504B, update the files 1504B, create new files, or access the files 1504B).

Performing the allocation may further include allocating a persistent storage resource to the unique user identifier in response to determining that the network file system includes the security policy. The allocating, in some examples, may include creating a persistent volume of the network file system and creating a persistent volume claim from the persistent volume. The term "persistent volume" may refer to a storage resource in a container cluster (e.g., a Kubernetes cluster) that provides persistent storage independent of the lifecycle of a node (e.g., which may also be referred to as a pod). The term "persistent volume claim" may refer to a request for storage by a node (e.g., by a pod). The allocating may further include mounting the persistent volume claim on a virtual machine and allocating the persistent volume claim to the unique user identifier. In a non-limiting example, as described with reference to FIGS. 15A and 15J, network file system 1504 may allocate persistent storage resource 1518 to one or more nodes of container cluster 1506 (e.g., one or more nodes executing compute session 1512).

In another example, as described with reference to FIG. 15K, a network file system 1504 may create a persistent volume 1554 at 1555. At 1557, the network file system 1504 may create a persistent volume claim 1556 from the persistent volume 1554. At 1558, the network file system may mount persistent volume claim 1556 on virtual machine 1516. At 1560, the network file system 1560 may allocate persistent volume claim 1556 to UID 1534A.

As shown in FIG. 14, process 1450 of method 1400 may execute, via the compute session, an operation for the authenticated user that modifies one or more files stored in the persistent storage resource. Operations that modify the one or more files may include deleting a first file of the one or more files stored in the persistent storage resource, renaming a second file of the one or more files stored in the persistent storage resource, updating contents of a third file of the one or more files stored in the persistent storage resource, adding a new file to the one or more files stored in the persistent storage resource, and/or moving a fourth file of the one or more files in the persistent storage resource to a new location within the persistent storage resource. In some examples, the operation may be requested via one or more nodes of the container cluster (e.g., one or more nodes executing the compute session and/or one or more nodes executing a code development application).

In some examples, the operation that modifies the one or more files in the persistent storage resource may be received from a code development application connected to the compute session, where the term "code development application" may refer to a software tool or integrated development environment (IDE) to facilitate the creation, editing, and management of code. In a non-limiting example, as described with reference to FIGS. 15A and 15L, a code development application 1514 may indicate, to compute session 1512, an operation 1562 that modifies files 1518A of persistent storage resource 1518, where compute session 1512 may execute the operation 1562. The compute session 1512 may then execute the operation 1562 to modify the files 1518A of persistent storage resource 1518 (e.g., renames, moves, creates, updates, or deletes a file).

In some examples, the one or more files stored in the persistent storage resource are copied from a network file system (e.g., files 1504B of network files system 1504 as depicted in FIG. 15J copied to persistent storage resource 1518 of FIG. 15L as files 1518A). In some such examples, a new UID and/or new GIDs may be automatically generated when new login attributes are received via user input. In such examples, after receiving the user input, one or more nodes of a container cluster (e.g., the one or more nodes executing the compute session) may configure the network file system to include a security policy (or to update an existing security policy) that authorizes the unique UID and/or the one or more GIDs to perform operations on the one or more files from the network file system (e.g., to copy the files, delete the files, create new files, or access the files). For instance, in a non-limiting example as described with reference to FIGS. 15A and 15G, one or more nodes of container cluster 1508 may configure network file system 1504 to include access control policy 1504A. Accordingly, network file system 1504 may use access control policy 1504A to grant access to files 1504B of network file system 1504 (e.g., for copying, deleting, creating, or accessing). For instance, the network files system 1504 may verify that UID 1534A and/or one or more GIDs 1534B are included within or otherwise indicated by access control policy 1504A and may enable operations to be performed on the files 1504B once verifying their inclusion.

As shown in FIG. 14, process 1460 of method 1400 may transmit, to a version control system, a version control operation that records the one or more files modified in the persistent storage resource to a code repository using the unique user identifier or the one or more unique group identifiers. The term "version control system" may refer to a system that tracks changes to files (e.g., files stored at the persistently stored resource) or code (e.g., code developed in the code development application) over time. An example of a version control system may include, but not be limited to, Git. The term "version control operation" may refer to one or more of cloning a code repository from the version control system, pulling a set of code updates from the code repository, and/or pushing the one or more files modified in the persistent storage resource to the code repository. In a non-limiting example, as described with reference to FIG. 15L, compute session 1512 may transmit, to version control system 1520, a version control operation 1563 that records files 1518A modified in persistent storage resource 1518.

In examples in which a new UID and/or new GIDs are automatically generated when new login attributes are received via user input, one or more nodes of the container cluster (e.g., one or more nodes executing a compute session) may configure the version control system to authorize the unique UID to accept the version control operation from the UID. For instance, in a non-limiting example, as described with reference to FIGS. 15A and 15H, one or more nodes of container cluster 1508 may configure version control system 1520 to include access control policy 1520A. Accordingly, version control system 1520 may use access control policy 1520A to grant access to repositories 1520B of version control system 1520 (e.g., may check that the UID and/or one or more GIDs are included in the access control policy 1520A and may enable version control operations to be performed if the UID and/or one or more GIDs are included). Alternatively, the access control policy 1520A may be updated to include a particular UID and/or one or more GIDs (e.g., to have the particular UID and/or one or more GIDs added).

In some examples, when a file in persistent storage resource 1518 (e.g., one or more files of files 1518A) is updated or modified (e.g., deleted), a corresponding copy of the file (e.g., within files 1504B) may be updated. For instance, an indication may be provided by virtual computer 1516 to network files system 1504 to update the file. Alternatively, the copy of the file at the network file system 1504 may only be updated once the file is pushed to version control system 1520 (e.g., via a version control operation 1563). For instance, the version control system 1520 or the virtual computer 1516 may provide signaling to network file system 1504 to update the copy of the file. Alternatively, one or more nodes of the container cluster 1506 may indicate, to the network file system 1504, to update files 1504B.

In some examples, the authentication response received at 1410 may not include the unique UID and/or the one or more GIDs. In such examples, one or more of the nodes of the container cluster (e.g., the nodes executing the compute session), a persistent storage resource in communication with the nodes, and a version control system may depend on the unique UID and the one or more GIDs for operation. That is, if an identity resolution service fails to generate the unique UID and the one or more GIDs, an identity resolution service may fail to generate a session initiation token (e.g., as there may be no UID and/or GIDs to which to apply pre-defined authorization criteria).

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments.

What is claimed is:

1. A computer-program product comprising a non-transitory machine-readable storage medium storing computer instructions that, when executed by one or more processors, perform operations comprising:

receiving, from a third-party identity management system, an authentication response indicating a set of login attributes for an authenticated user;

obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user;

granting, by the identity resolution service, a session initiation token when the set of identity and authorization attributes satisfy predefined authorization criteria;

in response to the identity resolution service granting the session initiation token:

allocating a compute session to the unique user identifier, and allocating a persistent storage resource to the unique user identifier, wherein allocating the persistent storage resource to the unique user identifier includes:

transmitting the session initiation token from the compute session to a network file system, decrypting the session initiation token to extract the unique user identifier and the one or more unique group identifiers, determining that the network file system includes a security policy authorizing the unique user identifier and the one or more unique group identifiers to copy one or more files in the network file system, and allocating the persistent storage resource to the unique user identifier in response to determining that the network file system includes the security policy;

executing, via the compute session, an operation for the authenticated user that modifies the one or more files stored in the persistent storage resource; and transmitting, to a version control system, a version control operation that records the one or more files modified in the persistent storage resource to a code repository using the unique user identifier or the one or more unique group identifiers.

2. The computer-program product according to claim 1, wherein obtaining the set of identity and authorization attributes for the authenticated user using the set of login attributes includes:

searching the identity resolution service for a user profile corresponding to the set of login attributes, and after searching the identity resolution service for the user profile, retrieving the unique user identifier and the one or more unique group identifiers from the user profile.

3. The computer-program product according to claim 1, wherein obtaining the set of identity and authorization attributes for the authenticated user using the set of login attributes includes:

detecting that the identity resolution service does not include a user profile corresponding to the set of login attributes, and in response to detecting that the identity resolution service does not include the user profile:

automatically generating the unique user identifier and the one or more unique group identifiers, creating the user profile that associates the set of login attributes with the unique user identifier and the one or more unique group identifiers, and returning, in a response from the identity resolution service, the unique user identifier and the one or more unique group identifiers.

4. The computer-program product according to claim 1, wherein the computer instructions, when executed by the one or more processors, perform operations further comprising:

before receiving the authentication response from the third-party identity management system:

receiving, via a user interface, user input activating an automatic unique user identifier generator control element and an automatic unique group identifier generator control element, and in response to receiving the user input, configuring the identity resolution service to generate the unique user identifier and the one or more unique group identifiers for the authenticated user when the set of login attributes are new to the identity resolution service.

5. The computer-program product according to claim 4, wherein:

the one or more files stored in the persistent storage resource are copied from the network file system, and the computer instructions, when executed by the one or more processors, perform operations further comprising:

after receiving the user input:

configuring the network file system to include the security policy that authorizes the unique user identifier to copy the one or more files from the network file system, and configuring the version control system to authorize the unique user identifier to accept the version control operation from the unique user identifier.

6. The computer-program product according to claim 1, wherein the session initiation token encrypts the unique user identifier and the one or more unique group identifiers associated with the authenticated user.

7. The computer-program product according to claim 1, wherein the computer instructions, when executed by the one or more processors, perform operations comprising:

in response to the identity resolution service granting the session initiation token:

providing the session initiation token to a logon manager application, authorizing, by the logon manager application, allocation of the compute session to the unique user identifier based on the session initiation token, and allocating, by the logon manager application, the compute session to the unique user identifier in response to the authorizing by the logon manager application.

8. The computer-program product according to claim 1, wherein the set of identity and authorization attributes satisfy the predefined authorization criteria when the one or more unique group identifiers correspond to:

a group that authorizes access to the compute session, and a group that authorizes access to the network file system linked to the persistent storage resource.

9. The computer-program product according to claim 1, wherein:

the authentication response does not include the unique user identifier and the one or more unique group identifiers, and the compute session, the persistent storage resource, and the version control system depend on the unique user identifier and the one or more unique group identifiers for operation.

10. The computer-program product according to claim 1, wherein allocating the persistent storage resource to the unique user identifier includes:

creating a persistent volume of the network file system, creating a persistent volume claim from the persistent volume, mounting the persistent volume claim on a virtual machine, and allocating the persistent volume claim to the unique user identifier.

11. The computer-program product according to claim 1, wherein the operation that modifies the one or more files in the persistent storage resource is received from a code development application connected to the compute session.

12. The computer-program product according to claim 1, wherein:

the unique user identifier associated with the authenticated user corresponds to a system-generated identifier that uniquely represents an identity of the authenticated user in a target system, and the one or more unique group identifiers associated with the authenticated user correspond to system-generated identifiers that uniquely represent permissions of the authenticated user in the target system.

13. The computer-program product according to claim 1, wherein the set of login attributes for the authenticated user includes one or more of:

a username associated with the authenticated user, an email address associated with the authenticated user, a first name associated with the authenticated user, and a last name associated with the authenticated user.

14. The computer-program product according to claim 1, wherein the operation that modifies the one or more files stored in the persistent storage resource includes one or more of:

deleting a first file of the one or more files stored in the persistent storage resource, renaming a second file of the one or more files stored in the persistent storage resource, updating contents of a third file of the one or more files stored in the persistent storage resource, adding a new file to the one or more files stored in the persistent storage resource, and moving a fourth file of the one or more files stored in the persistent storage resource to a new location within the persistent storage resource.

15. The computer-program product according to claim 1, wherein the version control operation corresponds to one or more of:

cloning the code repository from the version control system, pulling a set of code updates from the code repository, and pushing the one or more files modified in the persistent storage resource to the code repository.

16. A computer-implemented method, comprising:

receiving, from a third-party identity management system, an authentication response indicating a set of login attributes for an authenticated user;

obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user;

granting, by the identity resolution service, a session initiation token when the set of identity and authorization attributes satisfy predefined authorization criteria;

in response to the identity resolution service granting the session initiation token:

allocating a compute session to the unique user identifier, and allocating a persistent storage resource to the unique user identifier, wherein allocating the persistent storage resource to the unique user identifier includes:

transmitting the session initiation token from the compute session to a network file system, decrypting the session initiation token to extract the unique user identifier and the one or more unique group identifiers, determining that the network file system includes a security policy authorizing the unique user identifier and the one or more unique group identifiers to copy one or more files in the network file system, and allocating the persistent storage resource to the unique user identifier in response to determining that the network file system includes the security policy;

executing, via the compute session, an operation for the authenticated user that modifies the one or more files stored in the persistent storage resource; and transmitting, to a version control system, a version control operation that records the one or more files modified in the persistent storage resource to a code repository using the unique user identifier or the one or more unique group identifiers.

17. The computer-implemented method according to claim 16, wherein obtaining the set of identity and authorization attributes for the authenticated user using the set of login attributes includes:

searching the identity resolution service for a user profile corresponding to the set of login attributes, and after searching the identity resolution service for the user profile, retrieving the unique user identifier and the one or more unique group identifiers from the user profile.

18. The computer-implemented method according to claim 16, wherein obtaining the set of identity and authorization attributes for the authenticated user using the set of login attributes includes:

detecting that the identity resolution service does not include a user profile corresponding to the set of login attributes, and in response to detecting that the identity resolution service does not include the user profile:

automatically generating the unique user identifier and the one or more unique group identifiers, creating the user profile that associates the set of login attributes with the unique user identifier and the one or more unique group identifiers, and returning, in a response from the identity resolution service, the unique user identifier and the one or more unique group identifiers.

19. The computer-implemented method according to 16, further comprising:

before receiving the authentication response from the third-party identity management system:

receiving, via a user interface, user input activating an automatic unique user identifier generator control element and an automatic unique group identifier generator control element, and in response to receiving the user input, configuring the identity resolution service to generate the unique user identifier and the one or more unique group identifiers for the authenticated user when the set of login attributes are new to the identity resolution service.

20. The computer-implemented method according to claim 19, wherein:

the one or more files stored in the persistent storage resource are copied from the network file system, and the method further comprises:

after receiving the user input:

configuring the network file system to include the security policy that authorizes the unique user identifier to copy the one or more files from the network file system, and configuring the version control system to authorize the unique user identifier to accept the version control operation from the unique user identifier.

21. The computer-implemented method according to claim 16, wherein the session initiation token encrypts the unique user identifier and the one or more unique group identifiers associated with the authenticated user.

22. The computer-implemented method according to claim 16, further comprising:

in response to the identity resolution service granting the session initiation token:

providing the session initiation token to a logon manager application, authorizing, by the logon manager application, allocation of the compute session to the unique user identifier based on the session initiation token, and allocating, by the logon manager application, the compute session to the unique user identifier in response to the authorizing by the logon manager application.

23. The computer-implemented method according to claim 16, wherein the set of identity and authorization attributes satisfy the predefined authorization criteria when the one or more unique group identifiers correspond to:

a group that authorizes access to the compute session, and a group that authorizes access to the network file system linked to the persistent storage resource.

24. The computer-implemented method according to claim 16, wherein:

the authentication response does not include the unique user identifier and the one or more unique group identifiers, and the compute session, the persistent storage resource, and the version control system depend on the unique user identifier and the one or more unique group identifiers for operation.

25. The computer-implemented method according to claim 17, wherein allocating the persistent storage resource to the unique user identifier includes:

creating a persistent volume of the network file system, creating a persistent volume claim from the persistent volume, mounting the persistent volume claim on a virtual machine, and allocating the persistent volume claim to the unique user identifier.

26. The computer-implemented method according to claim 16, wherein the operation that modifies the one or more files in the persistent storage resource is received from a code development application connected to the compute session.

27. The computer-implemented method according to claim 16, wherein:

the unique user identifier associated with the authenticated user corresponds to a system-generated identifier that uniquely represents an identity of the authenticated user in a target system, and the one or more unique group identifiers associated with the authenticated user correspond to system-generated identifiers that uniquely represent permissions of the authenticated user in the target system.

28. A computer-implemented system comprising:

one or more processors;

a memory; and a computer-readable medium operably coupled to the one or more processors, the computer-readable medium having computer-readable instructions stored thereon that, when executed by the one or more processors, cause a computing device to perform operations comprising:

receiving, from a third-party identity management system, an authentication response indicating a set of login attributes for an authenticated user;

obtaining, from an identity resolution service, a set of identity and authorization attributes for the authenticated user using the set of login attributes, wherein the set of identity and authorization attributes at least include a unique user identifier (UID) and one or more unique group identifiers (GIDs) associated with the authenticated user;

granting, by the identity resolution service, a session initiation token when the set of identity and authorization attributes satisfy predefined authorization criteria;

in response to the identity resolution service granting the session initiation token:

allocating a compute session to the unique user identifier, and allocating a persistent storage resource to the unique user identifier, wherein allocating the persistent storage resource to the unique user identifier includes:

transmitting the session initiation token from the compute session to a network file system, decrypting the session initiation token to extract the unique user identifier and the one or more unique group identifiers, determining that the network file system includes a security policy authorizing the unique user identifier and the one or more unique group identifiers to copy one or more files in the network file system, and allocating the persistent storage resource to the unique user identifier in response to determining that the network file system includes the security policy;

executing, via the compute session, an operation for the authenticated user that modifies the one or more files stored in the persistent storage resource; and transmitting, to a version control system, a version control operation that records the one or more files modified in the persistent storage resource to a code repository using the unique user identifier or the one or more unique group identifiers.

29. The computer-implemented system according to claim 28, wherein obtaining the set of identity and authorization attributes for the authenticated user using the set of login attributes includes:

searching the identity resolution service for a user profile corresponding to the set of login attributes, and after searching the identity resolution service for the user profile, retrieving the unique user identifier and the one or more unique group identifiers from the user profile.

30. The computer-implemented system according to claim 28, wherein the session initiation token encrypts the unique user identifier and the one or more unique group identifiers associated with the authenticated user.

\* \* \* \* \*